(12) United States Patent
Kumar et al.

(10) Patent No.: US 12,450,504 B2
(45) Date of Patent: *Oct. 21, 2025

(54) EFFICIENTLY INFERENCING DIGITAL VIDEOS UTILIZING MACHINE-LEARNING MODELS

(71) Applicant: Adobe Inc., San Jose, CA (US)

(72) Inventors: Akhilesh Kumar, San Jose, CA (US); Xiaozhen Xue, Woodbridge, CT (US); Daniel Miranda, San Jose, CA (US); Nicolas Huynh Thien, San Francisco, CA (US); Kshitiz Garg, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/771,409

(22) Filed: Jul. 12, 2024

(65) Prior Publication Data
US 2024/0362506 A1  Oct. 31, 2024

Related U.S. Application Data

(63) Continuation of application No. 17/087,116, filed on Nov. 2, 2020, now Pat. No. 12,067,499.

(51) Int. Cl.
*G06N 5/04* (2023.01)
*G06N 20/00* (2019.01)
(Continued)

(52) U.S. Cl.
CPC ............. *G06N 5/04* (2013.01); *G06N 20/00* (2019.01); *G06T 1/20* (2013.01); *G06T 3/40* (2013.01); *G06V 20/49* (2022.01); *H04N 19/13* (2014.11)

(58) Field of Classification Search
CPC .......... G06N 5/04; G06N 20/00; G06N 3/044; G06N 3/045; G06N 5/01; G06N 3/063;
(Continued)

(56) References Cited

U.S. PATENT DOCUMENTS

| 4,918,523 A | * | 4/1990 | Simon | H04N 9/8216 |
| | | | | 375/240.23 |
| 5,815,164 A | * | 9/1998 | Howell | G06T 3/40 |
| | | | | 345/503 |

(Continued)

FOREIGN PATENT DOCUMENTS

| CN | 111433784 A | * | 7/2020 | G06V 20/41 |
| CN | 111654721 A | * | 9/2020 | H04N 21/2343 |

(Continued)

OTHER PUBLICATIONS

U.S. Appl. No. 17/087,116, Jan. 3, 2024, Office Action.
U.S. Appl. No. 17/087,116, Apr. 24, 2024, Notice of Allowance.

*Primary Examiner* — Stephen R Koziol
*Assistant Examiner* — Benedict E Lee
(74) *Attorney, Agent, or Firm* — Keller Preece PLLC

(57) ABSTRACT

This disclosure describes one or more implementations of a video inference system that utilizes machine-learning models to efficiently and flexibly process digital videos utilizing various improved video inference architectures. For example, the video inference system provides a framework for improving digital video processing by increasing the efficiency of both central processing units (CPUs) and graphics processing units (GPUs). In one example, the video inference system utilizes a first video inference architecture to reduce the number of computing resources needed to inference digital videos by analyzing multiple digital videos utilizing sets of CPU/GPU containers along with parallel pipeline processing. In a further example, the video inference system utilizes a second video inference architecture (Continued)

that facilitates multiple CPUs to preprocess multiple digital videos in parallel as well as a GPU to continuously, sequentially, and efficiently inference each of the digital videos.

20 Claims, 12 Drawing Sheets

(51) Int. Cl.
*G06T 1/20* (2006.01)
*G06T 3/40* (2024.01)
*G06V 20/40* (2022.01)
*H04N 19/13* (2014.01)

(58) Field of Classification Search
CPC . G06N 20/10; G06T 1/20; G06T 3/40; G06V 20/40; G06V 20/49; G06V 10/811; G06V 10/80; G06V 10/82; G06V 20/41; G06V 20/46; H04N 19/13; H04N 19/436; H04N 19/59; H04N 19/85
See application file for complete search history.

(56) References Cited

U.S. PATENT DOCUMENTS

| | | | |
|---|---|---|---|
| 6,122,020 A | 9/2000 | Abe et al. | |
| 8,006,201 B2* | 8/2011 | Bhattacharya | H04N 21/8456 715/825 |
| 8,477,143 B2* | 7/2013 | Harper | G06F 9/451 345/522 |
| 10,360,494 B2* | 7/2019 | Wang | G06F 18/24143 |
| 10,567,464 B2* | 2/2020 | Pang | H04N 13/232 |
| 10,582,200 B2* | 3/2020 | Srinivasamurthy | H04N 19/132 |
| 10,616,583 B2* | 4/2020 | Krishnan | H04N 19/61 |
| 11,057,635 B2* | 7/2021 | Xiang | G06T 7/20 |
| 11,277,606 B2* | 3/2022 | Misra | H04N 19/463 |
| 11,533,458 B2* | 12/2022 | Kim | H04N 23/617 |
| 11,599,376 B1* | 3/2023 | Viswanathan | G06F 9/3877 |
| 11,599,813 B1 | 3/2023 | Yuan et al. | |
| 11,743,535 B2* | 8/2023 | Pikus | H04N 21/234309 725/116 |
| 12,067,499 B2* | 8/2024 | Kumar | G06V 20/41 |
| 12,086,572 B1* | 9/2024 | Wu | G06N 3/04 |
| 12,217,486 B2* | 2/2025 | Kosaka | G06V 10/98 |
| 12,230,024 B2* | 2/2025 | Wang | H04N 19/40 |
| 2012/0230417 A1* | 9/2012 | Sole Rojals | H04N 19/129 375/240.18 |
| 2018/0103271 A1* | 4/2018 | Wang | H04L 65/65 |
| 2018/0247672 A1* | 8/2018 | Doyle | H04N 21/2365 |
| 2019/0042925 A1 | 2/2019 | Choe et al. | |
| 2020/0175392 A1 | 6/2020 | Tang et al. | |
| 2020/0184309 A1* | 6/2020 | Patel | G06F 17/16 |
| 2020/0242154 A1* | 7/2020 | Haneda | G06F 16/535 |
| 2020/0293783 A1* | 9/2020 | Ramaswamy | G06F 18/256 |
| 2020/0302223 A1* | 9/2020 | Dutta | G06V 20/69 |
| 2021/0056314 A1 | 2/2021 | Thiel et al. | |
| 2021/0056336 A1* | 2/2021 | Ikeda | G06N 3/084 |
| 2021/0089903 A1* | 3/2021 | Murray | G06T 3/4046 |
| 2021/0142068 A1 | 5/2021 | Aliamiri et al. | |
| 2021/0256427 A1* | 8/2021 | Schott | G06F 9/5011 |
| 2021/0342455 A1* | 11/2021 | Kshirsagar | G06N 3/084 |
| 2022/0067983 A1* | 3/2022 | Fidler | G06V 10/26 |
| 2022/0301295 A1* | 9/2022 | Livet | G06N 3/045 |
| 2022/0415039 A1* | 12/2022 | Wang | H04N 19/154 |
| 2023/0052483 A1 | 2/2023 | Cai et al. | |

FOREIGN PATENT DOCUMENTS

| | | | | |
|---|---|---|---|---|
| CN | 118301349 A | * | 7/2024 | G06N 5/045 |
| WO | WO-2021010958 A1 | * | 1/2021 | H04B 3/04 |

* cited by examiner

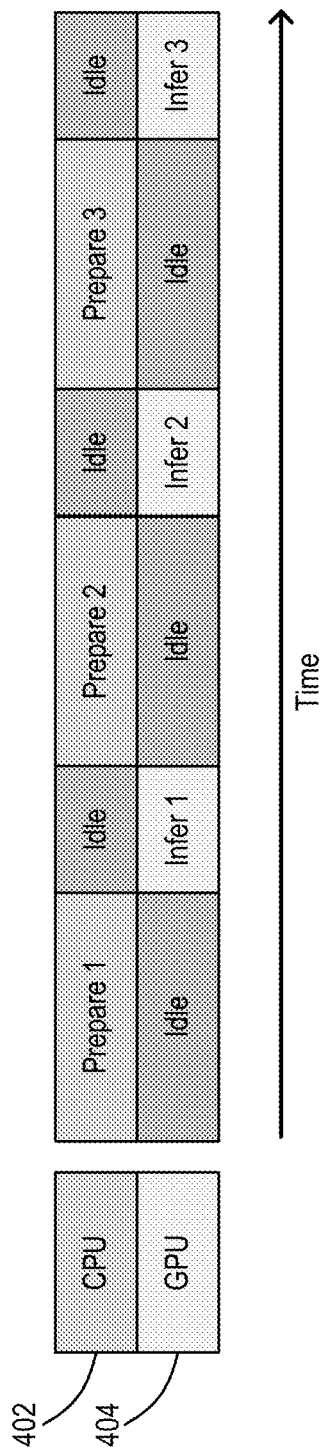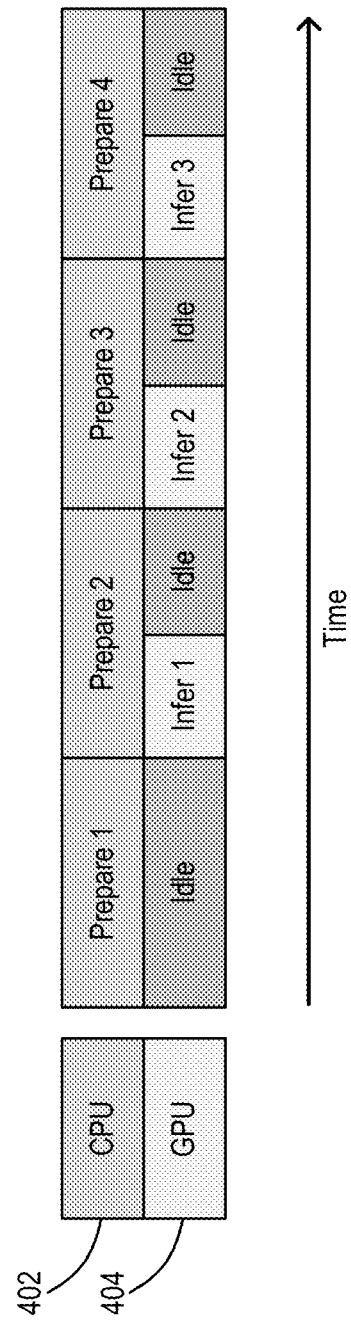
Fig. 4A
Fig. 4B

EFFICIENTLY INFERENCING DIGITAL VIDEOS UTILIZING MACHINE-LEARNING MODELS

CROSS-REFERENCE TO RELATED APPLICATIONS

The present application is a continuation of U.S. application Ser. No. 17/087,116, filed on Nov. 2, 2020. The aforementioned application is hereby incorporated by reference in its entirety.

BACKGROUND

Recent years have seen significant improvements in hardware and software platforms for training and utilizing machine-learning models. For instance, many deep-learning methods now achieve promising performance in a wide range of computer vision tasks (e.g., processing images and videos utilizing machine-learning models). For example, many conventional systems utilize machine-learning techniques to modify, edit, merge, touch up, or classify digital videos. While advances have been made in the field of computer vision, applying machine-learning techniques to digital videos is currently resource-intensive and computationally expensive. Further, notwithstanding these advances, conventional systems continue to suffer from a number of problems in the field of computer vision, and in particular, with regard to efficiency and flexibility of digital video processing.

BRIEF SUMMARY

Implementations of the present disclosure provide benefits and/or solve one or more of the foregoing or other problems in the art with systems, non-transitory computer-readable media, and methods that utilize video inferencing architectures to efficiently and flexibly improve digital video processing via machine-learning models. For instance, the disclosed systems provide a framework for improving digital video processing by increasing the usage rates of both central processing units (CPUs) and graphics processing units (GPUs). As one example, the disclosed systems reduce the number of computing resources needed to inference digital videos utilizing a first video inference architecture that facilitates analyzing multiple digital videos within sets of CPU/GPU containers with parallel pipeline processing. As another example, the disclosed systems utilize a second video inference architecture that facilitates multiple CPUs to simultaneously preprocess digital videos, which are then inferenced sequentially by a machine-learning model on a GPU. In this manner, the disclosed systems process digital videos quickly, at a low cost, and with significant improvements in computational efficiency.

The following description sets forth additional features and advantages of one or more implementations of the disclosed systems, computer-readable media, and methods.

BRIEF DESCRIPTION OF THE DRAWINGS

The detailed description provides one or more implementations with additional specificity and detail through the use of the accompanying drawings, as briefly described below.

FIGS. 4A-4B illustrate timing diagrams for processing digital video files utilizing versions of the first video inference architecture in accordance with one or more implementations.

DETAILED DESCRIPTION

Figure 1:
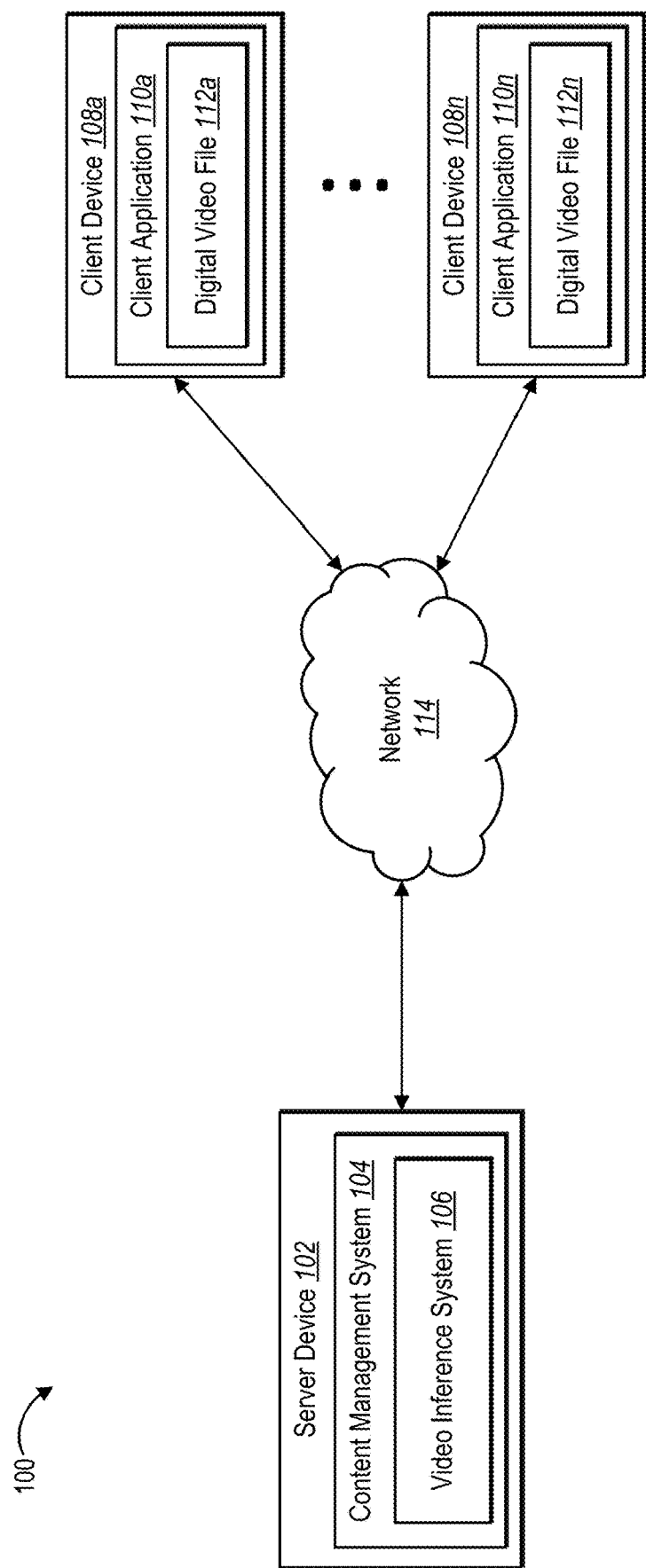
FIG. 1 illustrates a schematic diagram of an example system environment in which a video inference system operates in accordance with one or more implementations.

This disclosure describes one or more implementations of a video inference system that utilizes machine-learning models to efficiently and flexibly process digital videos utilizing various improved video inference architectures. For example, the video inference system provides a framework for improving digital video processing by increasing the efficiency of both central processing units (CPUs) and graphics processing units (GPUs). In one example, the video inference system utilizes a first video inference architecture to reduce the number of computing resources needed to inference digital videos by analyzing multiple digital videos utilizing sets of CPU/GPU containers along with parallel pipeline processing. In another example, the video inference system utilizes a second video inference architecture that utilizes multiple CPUs to simultaneously preprocess digital videos and a single GPU to quickly and efficiently inference each digital video sequentially and continuously.

In one or more implementations, the video inference system utilizes the first video inference architecture mentioned above. For example, the video inference system receives multiple digital video files (including a first digital video file and a second digital video file) for processing by a machine-learning model. In these implementations, the video inference system utilizes a CPU to extract a first set of video frames from the first digital video file in a first time period and a second set of video frames from the second digital video file in a second time period. In addition, the video inference system utilizes the machine-learning model on a GPU to batch inference the first set of video frames in the second time period as well as batch inference the second set of video frames in a third time period. Indeed, in various implementations, the video inference system utilizes parallel pipeline processing to preprocess digital videos at the CPU while concurrently inferencing digital videos at the GPU.

In one or more implementations, when utilizing the first video inference architecture to process multiple digital video files, the video inference system provides each digital video file to a CPU and GPU container pair (e.g., a CPU/GPU container). For example, as mentioned above, the CPU first extracts and decodes video frames, which is then followed by the GPU inferencing the decoded frames for the entire digital video file in a single pass.

As mentioned above, the video inference system utilizes parallel pipeline processing in various implementations. For example, the video inference system overlaps processing between the CPU frame extraction of one digital video file and GPU inferencing of other digital video files. In some implementations, the video inference system does not utilize parallel pipeline processing and instead fully finishes processing one digital video file across both the CPU and/or GPU before processing another digital video file.

As mentioned above, the video inference system utilizes the second video inference architecture in one or more implementations. To illustrate, in various implementations, the video inference system receives multiple digital video files. In these implementations, the video inference system generates arrayed video files, in parallel, for the digital video files utilizing multiple CPUs. For example, for each digital video file, the video inference system extracts and decodes video frames before combining them into a single arrayed video file. Further, in one or more implementations, the video inference system utilizes the machine-learning model to generate video output (e.g., inference results) utilizing a GPU by sequentially processing each of the arrayed video files.

As mentioned earlier, the video inference system generates arrayed video files. In various implementations, the video inference system generates a single arrayed video file for each incoming digital video file. For example, the video inference system extracts video frames from a digital video file, downsizes the extracted video frames to a resolution fitting the machine-learning model on the GPU, decodes the downsized video frames, and combines the decoded video frames into a single arrayed video file. In many implementations, the video inference system is able to generate an arrayed video file that is approximately the same size as the digital video file even after extracting and decoding video frames of the digital video file.

In one or more implementations, the video inference system utilizes a CPU to generate an arrayed video file for a digital video file, as mentioned above. For example, the video inference system utilizes one or more physical or virtual CPUs to preprocess the digital video file into a single arrayed video file. Further, in many implementations, the video inference system writes the preprocessed arrayed video file to disk or memory for access by the GPU. For multiple incoming digital video files, the video inference system is able to utilize multiple CPUs to concurrently generate multiple arrayed video files.

Additionally, in a number of implementations, the video inference system utilizes a GPU to process the digital video files, as indicated previously. Indeed, while GPUs are less efficient at performing the preprocessing tasks mentioned above, GPUs are very efficient at applying machine-learning models on digital video files-a process called inferencing. Further, a GPU commonly inferences an arrayed video file faster than a CPU is able to generate one. Accordingly, in various implementations, the video inference system couples a single GPU to multiple CPUs that are preprocessing multiple digital video files to generate a corresponding number of arrayed video files. The GPU then receives the arrayed video files and inferences them one-by-one. For example, the GPU fully processes a first arrayed video file and generates a result, score, or prediction before processing a second arrayed video file. Indeed, the GPU serially processes arrayed video files without any substantial pausing or stopping between files.

In various implementations, as further described below, the video inference system often utilizes multiple CPUs at the same time to preprocess multiple digital video files. Further, the video inference system fully utilizes a single GPU for inferencing the preprocessed digital video files. Indeed, as described below, in various implementations, the video inference system determines an optimal ratio architecture of CPUs to each GPU to ensure maximum efficiency across computing devices.

In one or more implementations, the video inference system adds additional CPUs and GPUs to handle larger volumes of incoming digital video files. As long as the optimal ratio architecture of CPUs to each GPU is followed, the video inference system is able to flexibly expand processing capabilities without losses in efficiency. Indeed, the video inference system facilitates doubling, tripling, or otherwise increasing the number of CPUs and GPUs to process more digital video files at the same time, where the GPUs are inferencing the digital video files at full utilization levels.

In some implementations, the video inference system performs post-processing on the inferenced digital video files. For example, the video inference system combines classifications, predictions, and/or scores generated for multiple digital video files. In another example, the video inference system combines one or more processed digital video files together. In one or more implementations, the video inference system utilizes the first video inference architecture to quickly and efficiently process a lengthy digital video file across multiple CPU/GPU containers before combining the final video output, as further described below.

As mentioned above, conventional systems suffer from a number of problems with regard to digital video processing. More particularly, many conventional systems require significant computational processing and real-time memory resources to apply inferencing to digital images. These requirements are amplified in digital videos because digital videos are made up of a sequence or stack of frames (i.e., images) and machine-learning techniques are applied to each individual image, followed by aggregating the processed images back together to create a new digital video. For example, a 5-minute digital video having 30 frames per second (30 fps) will have 9,000 frames. A standard machine-learning model (e.g., ResNet 50) takes approximately 0.3 seconds to process each image. In this example, processing the 5-minute video will take around 45 minutes. This is a significantly long time for processing a single video.

To overcome this issue, conventional systems utilize a fan-out approach that splits digital videos into several chunks and processes each chunk with multiple CPU/GPU containers (e.g., fan-out containers). While this approach shortens the processing time, it does so at great computing costs. More particularly, in addition to required additional hardware to support each fan-out container, this approach also requires additional components (e.g., a job distributor and a single video aggregator). Moreover, each fan-out container multiplies overhead and latency as well as adds to the inefficient use of component resources.

As just mentioned, most conventional systems utilize a job distributor to separate a digital video into chunks for processing by the multiple fan-out containers. For instance, it is common for conventional systems to fan-out a digital video into 50 chunks for processing by 50 fan-out containers. Once fanned out, each fan-out container processes a digital video chunk (e.g., extracts, processes, and reassembles each frame within the digital video chunk), a single video aggregator reassembles the digital video chunks back into the digital video. These additional components significantly increase computing processing and resource requirements, as detailed below.

Additionally, as mentioned above, under the above approach, conventional systems multiply overhead and latency. First, adding the job distributor adds latency when creating each of the digital video chunks. Next, for each fan-out container, latency is introduced in reading the video file. This reading latency is increased as each fan-out container is reading from the same digital video file (e.g., different frames from the same digital video) and must take turns before it can access the file. Moreover, before the single video aggregator proceeds with reassembling the digital video chunks into a digital video, it must wait for the slowest fan-out container to finish processing. Thus, reading latency and/or slow processing to one of the fan-out containers causes the entire digital video process to slow. Indeed, the latency added to the process is significant when compared to the time taken by the whole pipeline. Furthermore, if other portions of the digital video and/or additional digital videos are waiting in a queue to be processed, they too must wait (and are subject to the same processing delays).

Further, as mentioned above, conventional systems multiply overall overhead. For instance, for each fan-out container, processing overhead is introduced in the GPU. In general, processing overhead in the GPU is constant regardless of the size of the digital video chunk being processed. As the number of fan-out containers increases, however, so does the amount of processing overhead. Thus, while this processing overhead occurs in parallel by the fan-out containers, the total amount of computing resources needed to handle the processing overhead grows with each additional fan-out container, which leads to substantial computing inefficiencies.

Further, as mentioned above, under the above approach, conventional systems multiply the inefficient use of computing resources. For instance, due to some of the latencies discussed above, most conventional systems are unable to fully utilize computing resources to process digital videos. For example, some conventional systems shift processing digital videos from the CPU to the GPU to achieve some speed advantages. However, even in these cases, conventional systems are only able to achieve around 1-5% GPU utilization when inferencing a digital video. Thus, fanning out to multiple fan-out containers (e.g., CPU/GPU containers) causes each GPU in each container to be utilized around 5% of the time, which not only is grossly inefficient but also requires many more GPUs than should be needed. Furthermore, to make up for these computing inefficiencies, additional hardware is needed. As mentioned above, clusters of 50 fan-out containers are common. However, maintaining large amounts of fan-out containers (e.g., CPU/GPU containers) is very costly, especially for hardware that primarily sits unused 90% of the time.

In addition to conventional systems being inefficient, conventional systems that utilize the fan-out approach are inflexible. As described above, the fan-out approach does not scale, both in terms of computing resources and costs. Indeed, increasing the number of fan-out containers does not result in improved efficiency; rather, it magnifies computing inefficiencies as well as increases costs. Thus, increasing the number of fan-out containers quickly becomes infeasible and places rigid limits on expansion.

The video inference system provides numerous advantages and benefits over conventional systems. As described below, in many implementations, the video inference system improves both the efficiency and flexibility of computing devices as well as improves utilization of machine-learning models for digital video inferencing. To illustrate, the video inference system is able to improve efficiency relative to conventional systems by utilizing various video inferencing architecture that includes fewer components, less latency, and better utilization of the CPU and the GPU. For example, the video inference system does not utilize the fan-out approach described above, which requires a job distributor or single video aggregator to split and reassemble digital video chunks. Rather, the video inference system largely processes each digital video file as a single and complete unit, which reduces complexity over conventional systems.

In addition, by reducing these components and not utilizing the fan-out approach, the video inference system is able to avoid latency that is added from the job distributor (e.g., the time taken to divide up a digital video into chunks). Likewise, the video inference system eliminates the latency caused by each fan-out container waiting to read from the shared digital video. Further, the video inference system is able to reduce the processing overhead to one instance per digital video file rather than one instance per digital video chunk, which, in many cases, reduces this latency from 50 instances to a single instance. Moreover, by fully processing digital video files as single units, the video inference system reduces latency by not requiring a single video aggregator to reassemble the digital video chunks together or wait for the last digital video chunk to process before beginning to reassembly.

Furthermore, as mentioned above, the video inference system significantly increases the efficiency of digital video inferencing by a GPU. For example, in some implementations, the video inference system reduces idle time at the GPU utilizing CPU/GPU parallel pipelining. Further, in many implementations, the video inference system achieves 100% or near 100% GPU usage (as well as near-full CPU usage) during inferencing compared to the 1-5% GPU usage of conventional systems described above. Indeed, by moving frame extraction outside of the GPU, and preprocessing video frames of a digital video into a single arrayed file utilizing one or more CPUs, the GPU is able to sequentially inference digital videos for multiple digital videos with little to no idle time between digital video files. Further, because of efficiency gains, the video inference system increases processing speeds by around 30% over conventional systems.

As mentioned above, the video inference system also improves the flexibility of operation. For example, as noted previously, the video inference system utilizes video inferencing architectures with reduced components and complexity. Indeed, by eliminating the fan-out approach and the additional associated latency and overhead, the video inference system is able to easily scale while sustaining full capacity usage of any added CPUs and GPUs.

In addition, the video inference system generates an arrayed video file for a digital video file that is approximate in size to the input size of the digital video file rather than a file that explodes in size as is typical after frame extraction and decoding. Accordingly, by limiting the size of each arrayed video file, the video inference system is operational on computing devices with limited memory, such as client devices. Further, the video inference system enables the video inferencing architecture to be adapted to complete other machine-learning tasks. Moreover, the video inference system is able to adjust the video inferencing architecture to either process large videos very or several videos in a short time period, while maintaining and high-efficiency in each case.

Additional detail regarding the video inference system is now provided with reference to the figures. For example, FIG. 1 illustrates a schematic diagram of a system environment 100 in which a video inference system 106 operates in accordance with one or more implementations. As shown in FIG. 1, the system environment 100 ("environment 100") includes a server device 102 and client devices 108a, 108n connected via a network 114. Additional detail regarding these computing devices is provided below in connection with FIG. 11. Further, FIG. 11 also provides additional detail regarding networks, such as the illustrated network 114.

As shown, the server device 102 includes a content management system 104. In various implementations, the content management system 104 identifies, receives, accesses, opens, loads, edits, modifies, moves, copies, shares, saves, removes, deletes, stores, downloads, transmits, and/or imports digital content. An example of digital content includes digital video files (e.g., digital videos), digital images, and/or other digital documents. For instance, the content management system 104 manages multiple digital video files for multiple users in some implementations.

As illustrated, the content management system 104 includes a video inference system 106 (i.e., a digital video machine-learning inference system). While shown within the content management system 104, in various implementations, the video inference system 106 is located apart from the content management system 104. Further, in some implementations, the video inference system 106 is implemented on a client device (e.g., the client device 108a) or across multiple computing devices (e.g., on both the server device 102 and the client device 108a).

In one or more implementations, the video inference system 106 processes digital video files utilizing machine-learning models. For instance, the video inference system 106 inferences one or more of the digital video files 112a-112n received from the client devices 108a-108n to predict or generate a video output (e.g., inference results). For example, the video inference system performs object detection or performs automatically image correction in the digital video files. More particularly, the video inference system utilizes improved video inference architectures to efficiently inference the digital videos, as further described below.

By way of context, machine-learning models include algorithms that model high-level abstractions in data by generating data-driven predictions or decisions from the known input data. Examples of machine-learning models include computer representations that are tunable (e.g., trained) based on inputs to approximate unknown functions. For instance, a machine-learning model includes a model that utilizes algorithms to learn from, and make predictions on, known data by analyzing the known data to learn to generate outputs that reflect patterns and attributes of the known data. For example, machine-learning models include neural networks (e.g., a convolutional neural network (CNN), residual learning neural network, recurrent neural network (RNN) such as LSTMs, generative adversarial neural network (GAN), and single-shot detect (SSD) network), linear regression models, logistical regression models, random forest models, support vector machines (SVG) models, or decision tree models.

As illustrated in FIG. 1, the environment 100 includes the client devices 108a-108n. In some implementations, the client devices 108a-108n access the video inference system 106. For instance, a client application 110a, 110n (e.g., a web browser or a mobile application) on each of the client devices 108a-108n provides access to the video inference system 106. For example, each of the client applications 110a-110n facilitates providing digital video files 112a, 112n to the video inference system for inferencing utilizing a machine-learning model on the server device 102 and/or downloaded to the client devices 108a-108n.

As shown, the client devices 108a-108n include the digital video files 112a-112n. Each of the client devices 108a-108n stores, accesses, edits, and/or plays one or more digital video files. In various implementations, a digital video file includes a set of ordered or stacked digital images within a data structure (e.g., file) that when rendered displays a series of images. Commonly, the images within a digital video file are called vide frames. Digital video files may vary in length, size, resolution, quality, and content.

Although illustrated on the server device 102 in FIG. 1, in one or more implementations all, or a portion of, the video inference system 106 is located on the client devices 108a-108n. For instance, each of the client devices 108a-108n hosts and implements an instance of the video inference system 106 and facilitates digital video file inferencing. For example, a client application on a client device downloads an application from the server device 102 (e.g., a digital video editing application) or a portion of a software application that enables the client device to inference digital video files. In another instance, the client devices 108a-108n preprocess the digital video files 112a-112n into arrayed video files and provide the arrayed video files to the video inference system 106 for inferencing (or vice versa).

Although FIG. 1 illustrates a particular number, type, and arrangement of components within the environment 100, various additional environment configurations are possible. For instance, the server device 102 represents a set of connected server devices. Further, the environment 100 may include additional components, such as a computing device that maintains a repository of digital content items (e.g., digital video files) and/or processing results. For example, in one or more implementations, the environment 100 includes a computing device (e.g., a cloud computing device, a network device, or another server device) that provides digital video files to the video inference system 106 for processing (e.g., to perform batch inferencing for a group of digital video files).

Figure 2:
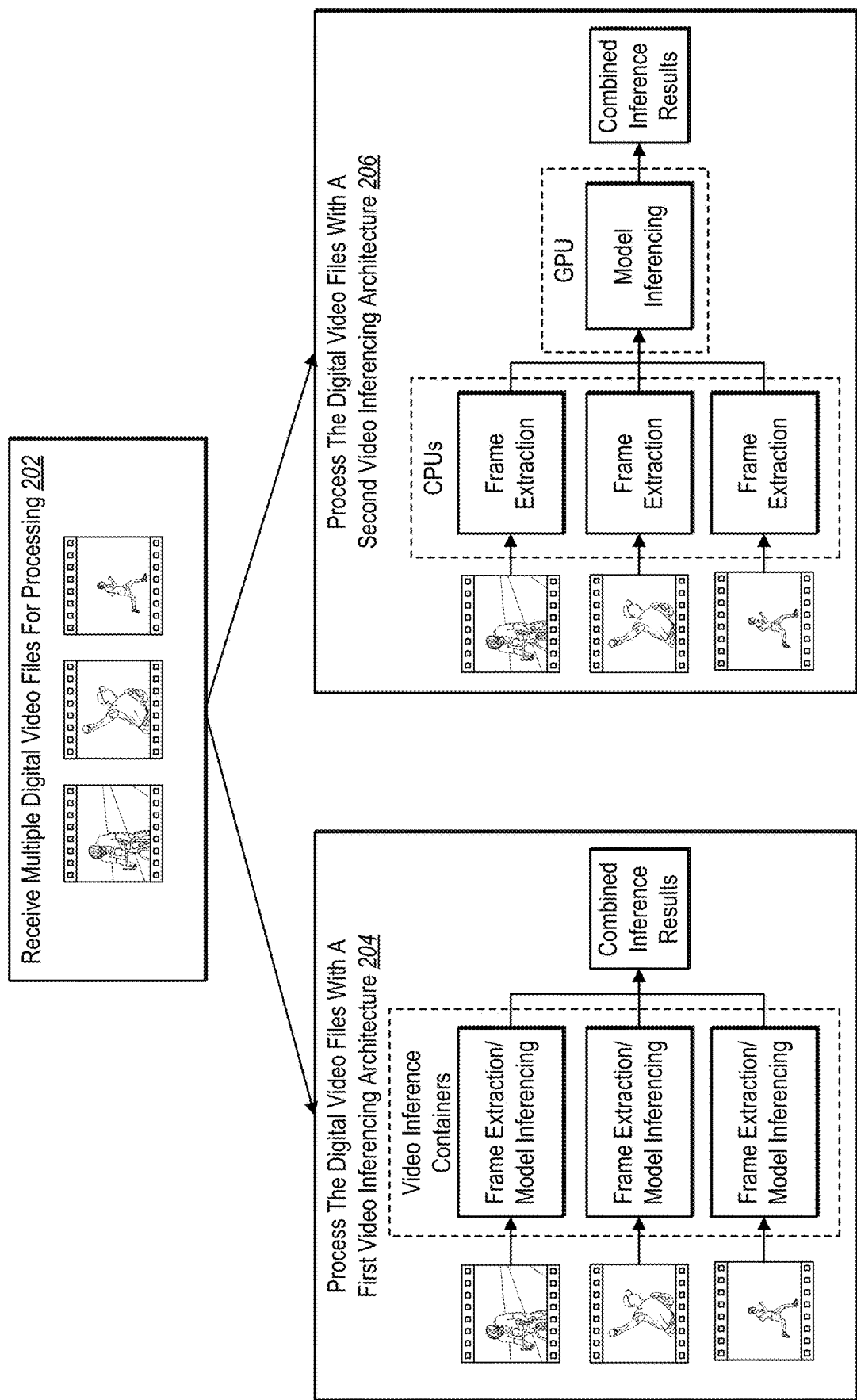
FIG. 2 illustrates various video inference architectures that the video inference system utilizes to process digital video files in accordance with one or more implementations.

As discussed above, in various implementations, the video inference system 106 efficiently inferences digital video files. To illustrate, FIG. 2 shows an overview of different video inference architectures for inferencing digital video files. In particular, FIG. 2 illustrates various video inference architectures that the video inference system utilizes to process digital video files in accordance with one or more implementations.

As shown in an act 202 of FIG. 2, the video inference system 106 receives multiple digital video files for processing. For example, as described above, one or more client devices provide digital video files to the video inference system 106 for processing (e.g., inferencing) by one or more machine-learning models, such as performing image modification within the digital video files, detecting objects within the digital videos, classifying the digital video files, and/or augmenting reality. In another example, one or more server devices provides the digital video files to the video inference system 106 for processing.

As also shown, the video inference system 106 selects from multiple video inference architectures for generating combined inference results from the digital videos. In one or more implementations, as shown in an act 204, the video inference system 106 processes the digital video files with a first video inference architecture. As shown, the first video inference architecture utilizes a video inference container to simultaneously extract and inference each digital video file. In various implementations, each video inference container utilizes a CPU and/or GPU to perform video frame extraction and machine-learning model inferencing of a digital video file. Additional detail regarding the first video inference architecture is provided below with respect to FIGS. 3, 4A, and 4B.

In some implementations, as shown in an act 206, the video inference system 106 processes the digital video files with a second video inference architecture. As shown, the second video inference architecture utilizes multiple CPUs to extract video frames (e.g., preprocess the digital videos) along with a GPU to inference each preprocessed digital video file. For example, under the second video inference architecture, the CPUs preprocess the digital video files in parallel while the GPU inferences each preprocessed digital video file sequentially. Additional detail regarding the second video inference architecture is provided below with respect to FIGS. 5A, 5B, and 6.

Figure 3:
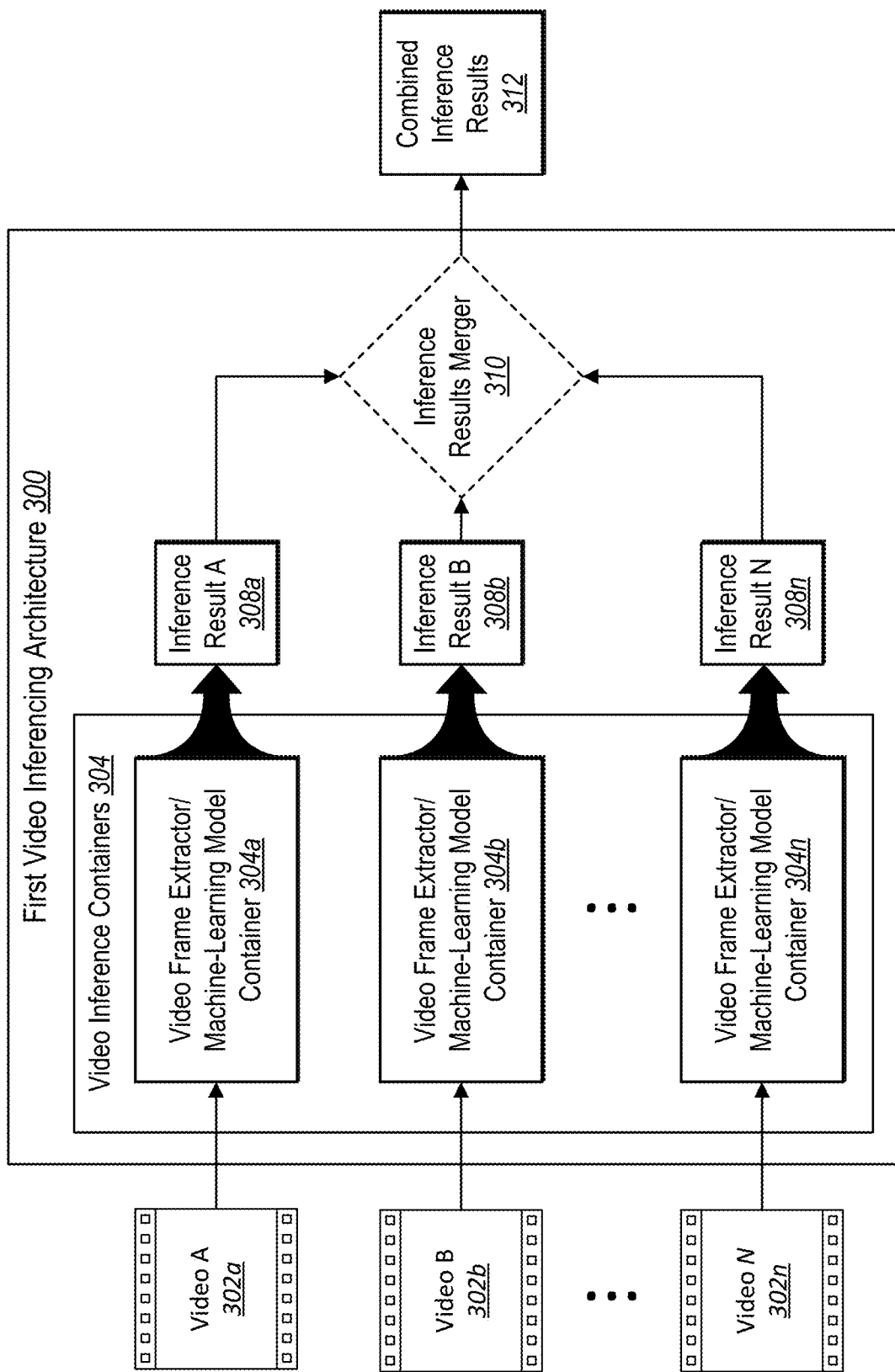
FIG. 3 illustrates a block diagram of a first video inference architecture for processing multiple digital videos in accordance with one or more implementations.

As mentioned above, the video inference system 106 provides numerous advantages over conventional systems by utilizing various video inferencing architectures that include fewer components, less latency, and better utilization of the CPU and the GPU. To illustrate, FIGS. 3, 4A, and 4B provide additional detail regarding the first video inference architecture. In particular, FIG. 3 shows a block diagram of a first video inference architecture 300 for processing multiple digital video files in accordance with one or more implementations.

As shown, FIG. 3 includes digital video files (e.g., Video A 302a, a Video B 302b, and Video N 302n), the first video inference architecture 300, and combined inference results 312. Further, as shown, the first video inference architecture 300 includes video inference containers 304 (e.g., video frame extractor/machine-learning model containers 304a, 304b, 304n), inference results (e.g., Inference Results A 308a, Inference Results B 308b, Inference Results N 308n), and an inference results merger 310.

Additionally, as shown, the video inference system 106 generates the combined inference results 312 from the digital video files (e.g., Videos A-N 302a-302n) utilizing the first video inference architecture 300. For instance, in one or more implementations, the video inference system 106 receives the digital video files (e.g., Videos A-N 302a-302n) from a source computing device as described above, or from another source. Additionally, the video inference system 106 provides each video to a separate video inference container for processing. For example, the video inference system 106 provides Video A 302a to the first video frame extractor/machine-learning model container 304a to generate the Inference Results A. Similarly, as shown, the video inference system 106 provides other digital video files to other video inference containers for separate and individual processing.

As mentioned above, the video inference containers 304 (e.g., digital video analyzers) include multiple video frame extractor/machine-learning model containers 304a-304n. In various implementations, a video frame extractor/machine-learning model container (or simply "a video inference container") extracts video frames from a digital video file as well as performs other tasks to prepare the digital video file for inferencing. For example, a video inference container also decodes and/or resizes the extracted video frames for a digital video file.

Further, as shown, a video inference container performs batch inferencing on a digital video file. In one or more implementations, batch inferencing includes generating predictions on a batch of observations. For instance, in various implementations, the video inference container and/or video inference system 106 utilizes batch inferencing to process a set of extracted and decoded video frames from a digital video file to generate an inference result. In some implementations, batch inferencing includes processing multiple extracted video frames together (e.g., in batches of 256). Examples of performing inferences include image classifications, image segmentation, video frame modifications, or detected objects. Additionally, in example implementations, the video inference system 106 utilizes the machine-learning model to perform other computer vision tasks on the digital video files as part of inferencing.

In various implementations, the video inference containers 304 include CPU components and/or GPU components. In one example, a video inference container is located on a CPU such that the video inference system 106 utilizes the CPU to extract video frames and generate the inference results. In another example, a video inference container is located on a GPU such that the video inference system 106 utilizes the GPU to extract video frames and generate the inference results. Further, in some implementations, a video inference container includes operations on both a CPU and a GPU. For example, in one or more implementations, the video inference system 106 utilizes the CPU to perform video frame extraction and other preprocessing and the GPU to generate the inference results.

In one or more implementations, the video inference system 106 combines the inference results. For instance, the video inference system 106 utilizes the optional inference results merger 310 to aggregate the inference results from the processed digital video files and generate the combined inference results 312. For example, if each container includes an object classification machine-learning model that detects whether a video includes a dog or a cat, the video inference system 106 tallies the total number of dog videos and cat videos in the combined inference results 312.

In some implementations, the optional inference results merger 310 performs post-processing on one or more of the inference results generated by a video inference container. For example, the inference results merger 310 combines portions from one or more processed digital video files to generate a new digital video file. In another example, the inference results merger 310 applies additional filters or adjustments to a processed digital video file. As a further example, a video inference container segments one or more objects in a digital video file and the inference results merger 310 utilizes the segmented object in a new digital video file or another type of file (e.g., a digital image).

In some implementations, the first video inference architecture 300 does not include the inference results merger 310 and, as a result, does not generate the combined inference results 312. For instance, in these implementations, the video inference system 106 utilizes the video inference containers 304 to process and/or modify the digital video files (e.g., Videos A-N 302*a*-302*n*), then returns the modified digital video files to the sources that provided the digital video file. For example, multiple client devices provide digital video files to the video inference system 106 for image correction, object segmenting, or other video processing, the video inference system 106 utilizes different video inference containers to individually process the digital video files, then returns the modified digital video files (e.g., the inference results) to the respective client devices.

As noted above, the first video inferencing architecture includes fewer components, less latency, and better utilization of the GPU than conventional systems. For example, unlike conventional systems, the first video inference architecture 300 does not require a job distributor, fan-out containers, or a single video aggregator. By eliminating these components, the video inference system 106 simplifies the overall architecture and reduces computing complexity.

Additionally, the first video inference architecture 300 increases processing speeds compared to the fan-out approach. To illustrate, the first video inference architecture 300 removes the latency introduced by the job distributor in splitting up a digital video file into multiple chunks. In contrast, the video inference system 106 processes each digital video file in its entirety with a separate video inference container. Further, because each digital video file is individually processed, the first video inference architecture 300 also eliminates the reading latency described above where each fan-out container waits its turn to read from the same digital video file.

As another example, because the video inference system 106 does not separate a digital video file into chunks but processes each digital video file utilizing a single video inference container, file reading latency is drastically reduced, if not eliminated. In addition, because each digital video file is individually processed, the first video inference architecture 300 does not require the single video aggregator, which adds latency when waiting for the last video chunk in the fan-out containers to finish processing before recompiling a processed digital video file.

Notably, the inference results merger 310 in the first video inference architecture 300 is different from a single video aggregator as the inference results merger 310 combines inference results from multiple processed digital video files. For example, conventional systems that perform similar tasks typically require an inference results merger in addition to the single video aggregator. Further, these conventional systems would have to wait a longer time period for multiple digital video files to process before the inference results merger could generate combined inference results.

In addition, along with reducing computing complexity, the first video inference architecture 300 also minimizes failure rates as each digital video file is processed by a single video inference container. Indeed, because the fan-out approach includes separating and reassembling separately digital video portions processed in different fan-out containers, errors and faults occur more frequently.

Moreover, as mentioned above, the first video inference architecture 300 facilitates better utilization of the GPU over conventional systems. As described above, by not fanning out a single digital video file into multiple fan-out containers utilizing multiple GPUs, but rather utilizing a single GPU in various implementations to inference each digital video file, the first video inference architecture 300 significantly reduces the duplicative processing overhead. Accordingly, in these implementations, GPU processing for each digital video file is reduced, which adds up when multiple digital video files are needing to be processed.

As an additional benefit, unlike conventional systems, the first video inference architecture 300 is easily scalable. For example, FIG. 3 shows the video inference system 106 utilizing the first video inference architecture 300 to process at least three digital videos in parallel. Indeed, the first video inference architecture 300 is able to accommodate additional video inference containers to concurrently process a corresponding number of incoming digital video files.

As described above, because each video inference container processes an entire digital video file per container, each additional video inference capitalizes on the same efficiency gains described above. To illustrate, to process fifty (i.e., 50) digital video files, a conventional system employing the fan-out approach would process the first video by separating the video into chunks, process the chunks at different fan-out containers, then reassemble the chunks into a processed digital video file, as described above. Once the first video processes, the conventional system is only then able to begin processing the second digital video file. Indeed, the 49 previous digital video files must be processed before the 50th video is able to be processed. In contrast, the first video inference architecture 300 facilitates separately processing all 50 digital video files at the same time via a corresponding number of video inference containers 304. Thus, in some implementations, while processing each digital video file utilizing the first video inference architecture 300 may take longer per video than conventional systems, the overall time of processing multiple digital video files is much faster because multiple latency delays are eliminated and the same computing hardware is used more efficiently.

As mentioned above, in some implementations, a video inference container includes both a CPU and a GPU. To better illustrate the video inference system 106 processing a queue of digital video files utilizing one of these video inference containers, FIGS. 4A-4B shows example video processing timing sequences. In particular, FIGS. 4A-4B shows block timing diagrams for processing digital video files utilizing the first video inference architecture in accordance with one or more implementations.

As shown, FIGS. 4A-4B each includes a CPU 402 and a GPU 404, which, for example, reside within a video inference container. In addition, FIGS. 4A-4B show the video inference system 106 preparing (e.g., preprocessing) and inferencing digital video files. For example, FIGS. 4A-4B show the video inference system 106 utilizing the CPU 402 in a video inference container to preprocess a first digital video file (shown as "Prepare 1"), a second digital video file (shown as "Prepare 2"), a third digital video file (shown as "Prepare 3"), and (in FIG. 4B) a fourth digital video file (shown as "Prepare 4"). Similarly, FIGS. 4A-4B show the video inference system 106 utilizing the GPU 404 in the same video inference container to inference the first digital video file (shown as "Infer 1"), the second digital video file (shown as "Infer 2"), and the third digital video file (shown as "Infer 3"). FIGS. 4A-4B also include idle time slots when the CPU 402 or the GPU 404 are not processing digital video files (shown as "idle").

In various implementations, the processing timing sequence in FIG. 4A corresponds to the first video inference architecture 300 described above. For example, a video inference container within the first video inference architecture 300 includes both the CPU 402 and the GPU 404. In these implementations, the video inference system 106 utilizes the CPU 402 to perform video frame extraction and other preprocessing tasks (i.e., "Prepare N") and the GPU 404 to generate the inference results (i.e., "Infer N").

As shown in FIG. 4A, the CPU 402 preprocesses the first digital video file during a first time period while the GPU 404 is idle. When the CPU 402 completes preparing the first digital video file, the GPU 404 begins inferencing the first digital video file during a second time period. However, as shown, during the second time period while the GPU 404 is inferencing the first digital video, the CPU 402 is idle. The video inference system 106 repeats the same pattern of preprocessing a digital video file in one time period at the CPU 402 while the GPU 404 is idle, then inferencing the digital video file at the next time period at the GPU 404 while the CPU 402 is idle.

While utilizing the first video inference architecture 300 in this manner as shown in FIG. 4A outperforms systems in terms of efficiency and flexibility, the video inference system 106 is able to achieve additional improvements utilizing parallel pipeline processing across the CPU 402 and the GPU 404 to preprocess and inference digital video files. To illustrate, FIG. 4B shows a processing timing sequence utilizing the first video inference architecture 300 where the video inference system 106 is implementing parallel pipeline processing.

As shown in FIG. 4B, as before, CPU 402 preprocesses the first digital video file (i.e., shown as "Prepare 1") during a first time period while the GPU 404 is idle. However, rather than idly wait in the second time period, the video inference system 106 utilizes the CPU 402 in the video inference container to begin processing the second digital video file (i.e., shown as "Prepare 2"). At the same time (e.g., during the second time period), the video inference system 106 utilizes the GPU 404 in the video inference container to begin inferencing the first digital video file (i.e., shown as "Infer 1"). Upon inferencing the first video file, the GPU 404 waits until another digital video file is ready to inference. Accordingly, as shown, in each subsequent time period, the CPU 402 and the GPU 404 operate in parallel to process digital video files.

As mentioned above, in one or more implementations, the video inference system 106 operates multiple video inference containers concurrently. In some implementations, each video inference container utilizes parallel processing to improve the efficiency and usage of both CPUs and GPUs. Indeed, in various implementations, the video inference system 106 utilizes parallel processing across multiple video inference containers operating simultaneously to quickly process a large number of digital video files.

While adding processing pipelining to the first video inference architecture 300 improves efficiency with respect to conventional systems, as shown in FIG. 4B, the GPU 404 is not being fully utilized. For example, the GPU 404 remains idle for portions of each time period while waiting for digital video files to be prepared. Accordingly, in one or more implementations, the video inference system 106 alternatively utilizes a second video inference architecture that further improves efficiency with respect to processing digital video files utilizing machine-learning models.

Figure 5A:
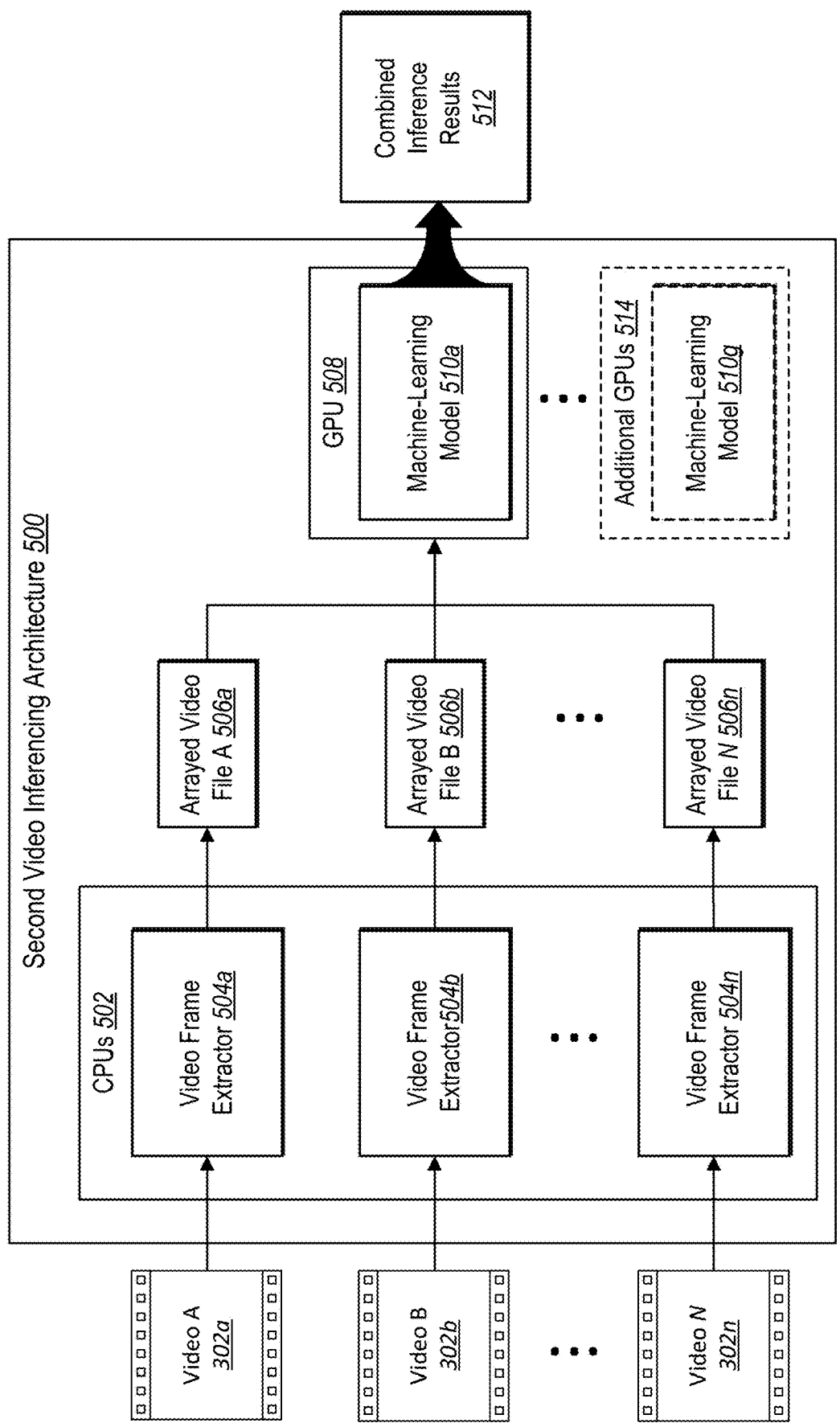
FIGS. 5A-5B illustrate block diagrams of a second video inference architecture for processing multiple digital videos in accordance with one or more implementations.
Figure 5B:
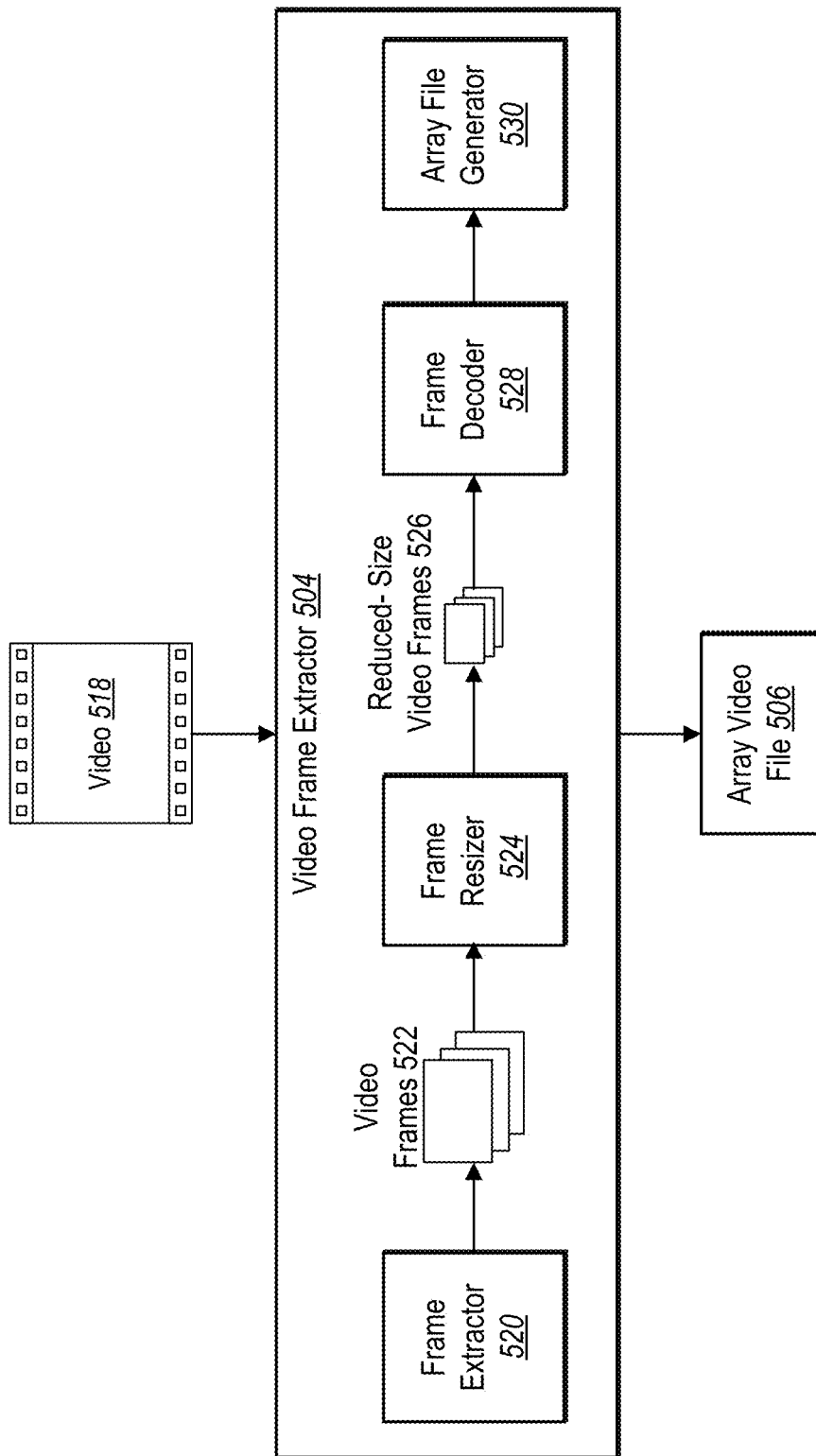
Figure 6:
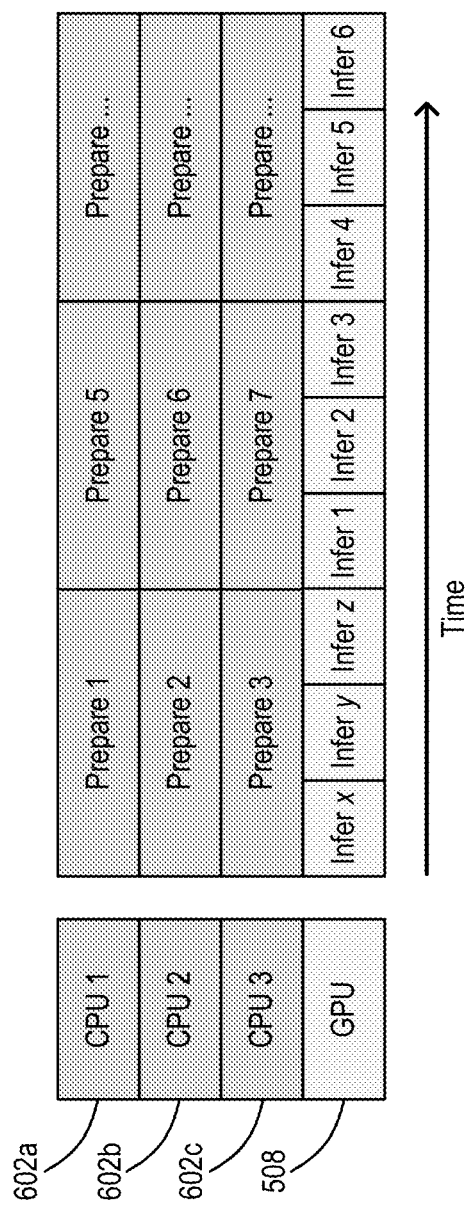
FIG. 6 illustrates a timing diagram for processing digital video files utilizing the second video inference architecture in accordance with one or more implementations.

FIGS. 5A, 5B, and 6 provide additional details regarding a second video inference architecture. In particular, FIG. 5A shows a block diagram of a second video inference architecture 500 for processing multiple digital videos in accordance with one or more implementations. As shown, FIG. 5A includes digital video files (e.g., Video A 302*a*, a Video B 302*b*, and Video N 302*n*), the second video inference architecture 500, and combined inference results 512. Further, as shown, the second video inference architecture 500 includes CPUs 502 having video frame extractors 504*a*, 504*b*, 504*n*; arrayed video files 506*a*, 506*b*, 506*n*; and a GPU 508 having a machine-learning model 510*a*. In some implementations, the second video inference architecture 500 optionally includes additional GPUs 514 each having an additional machine-learning model 510*g*.

In one or more implementations, the digital video files (e.g., Video A 302*a*, a Video B 302*b*, and Video N 302*n*) resemble the digital video file described above with respect to FIG. 3. Indeed, in various implementations, the second video inference architecture 500 offers the video inference system 106 an alternative approach to the first video inference architecture 300 for inferencing digital video files. Moreover, as mentioned above, in many implementations, the second video inference architecture 500 provides improved efficiency over conventional systems as well as the first video inference architecture 300 with respect to video inferencing. Indeed, by utilizing the second video inference architecture 500, in many instances, the video inference system 106 achieves full GPU utilization (e.g., 100% usage) while inferencing digital video files.

As shown, the video inference system 106 provides each of the digital video files (e.g., Video A 302*a*, a Video B 302*b*, and Video N 302*n*) to one of the video frame extractors 504*a*-504*n*. For example, the video inference system 106 provides Video File A 302*a* to the first video frame extractor 504*a*. In one or more implementations, the video inference system 106 utilizes multiple video frame extractors at the same time to concurrently preprocess multiple digital video files.

Additionally, as shown, each of the video frame extractors 504*a*-504*n* preprocess the digital video files to generate the arrayed video files 506*a*-506*n*. For example, the first video frame extractor 504*a* generates Arrayed Video File A 506*a* from Video File A 302*a*. Additional detail regarding operations of the video frame extraction and the video frame extractors 504*a*-504*n* is provided below with respect to FIG. 5B.

In one or more implementations, each of the video frame extractors 504*a*, 504*b*, 504*n* corresponds to a separate CPU of the CPUs 502. For example, the first video frame extractor 504*a* resides and utilizes a CPU to generate Arrayed Video File A 506*a* from Video A 302*a* while the second video frame extractor 504*b* resides and utilizes another CPU to generate Arrayed Video File B 506*b* from Video B 302*b*. In some implementations, a video frame extractor spans multiple CPUs (e.g., multithreading across multiple virtual CPUs or vCPUs). In various implementations, multiple video frame extractors are located on a single CPU (e.g., the first video frame extractor 504*a* and the second video frame extractor 504*b* both utilize the same CPU).

As mentioned above, the video inference system 106 generates the arrayed video files 506*a*-506*n* from the digital video files. In particular, the video inference system 106 generates an arrayed video file for each digital video file. In one or more implementations, each of the arrayed video files 506*a*-506*n* includes an array of values that store information and characteristics of a digital video file. In various implementations, an arrayed video file stores shape and other object information to enable computing devices to correctly reconstruct a data array, even if the computing devices have different hardware architectures. For instance, the video inference system 106 utilizes the arrayed video files 506*a*-506*n* to store and load digital video files that are preprocessed (by a video frame extractor) and ready for inferencing (e.g., by the machine-learning model 510a). An example of an arrayed video file includes a NumPy binary file.

In some implementations, the video inference system utilizes unsigned bytes to represents pixels of video frames with an arrayed video file for a digital video file. For example, in various implementations, the video inference system 106 represents each pixel with a single byte utilizing the uint8 format. Often, preprocessing a digital video file greatly expands the size of the file, however, in various implementations, by representing each pixel with a single bit (in addition to image resizing as described below), the video inference system 106 generates an arrayed video file that is the same size as the digital video file.

As shown, the video inference system 106 provides multiple arrayed video files to a machine-learning model for inferencing. For example, the video inference system 106 provides each of the arrayed video files 506a-506n to the machine-learning model 510a (or multiple machine-learning models) within the GPU 508. In one or more implementations, the video inference system 106 writes the arrayed video files 506a-506n to disk or memory from which the GPU accesses and reads. The machine-learning model 510a then inferences each of the arrayed video files 506a-506n. For example, the machine-learning model 510a generates one or more inference results for the arrayed video files utilizing a convolutional neural network trained to modify and/or otherwise analyze digital video files.

In one or more implementations, the machine-learning model 510a inferences each of the arrayed video files 506a-506n sequentially in the order they arrive (e.g., first-in-first-out or FIFO). In various implementations, the machine-learning model 510a fully inferences one arrayed video file before inferencing the next arrayed video file. For example, the video inference system 106 utilizes the machine-learning model 510a in the GPU 508 to inference Arrayed Video File A 506a and generate an inference result before inferencing Arrayed Video File B 506b.

As mentioned above, in a number of implementations, the machine-learning model 510a loads an arrayed video file (e.g., a NumPy file) from memory and processes the file in batch mode. More specifically, since the arrayed video file is saved in a preprocessed version (e.g., video frames extracted, resized, and/or decoded) of a digital video file, in one or more implementations, the GPU 508 simply loads the arrayed video file from memory and utilizes the machine-learning model 510a to quickly inference the preprocessed video frames in a batch of n frames (e.g., 256 frames). Without needing to preprocess the digital video files, the GPU 508 inferences a number of arrayed video files in a short amount of time, as the hardware of GPUs is specialized to perform these types of repetitive operations.

As shown, in one or more implementations, the video inference system 106 generates the combined inference results 512. In various implementations, the combined inference results 512 matches the combined inference results 312 described above with respect to FIG. 3. Indeed, while the second video inference architecture 500 differs from the first video inference architecture 300 described above, both video inference architectures provide the video inference system 106 with the same end inference results. In some implementations, the video inference system 106 does not generate the combined inference results 512 but directly outputs and/or returns modified digital video files, as described above.

As mentioned above, the design of the second video inference architecture 500 improves upon the first video inference architecture 300 and enables the video inference system 106 to achieve full GPU utilization. For example, similar to the first video inference architecture 300, each digital video file is preprocessed separately. For instance, in one or more implementations, the video inference system 106 provides each digital video file to a separate video frame extractor located on its own CPU. Different from the first video inference architecture 300, however, the video inference system 106 moves the video frame extractors 504a-504n outside of the video inference containers, as shown in the second video inference architecture 500 in FIG. 5A. Indeed, as described above, the video inference system 106 separates the video frame extractors from machine-learning models by moving the video frame extractors 504a-504n to the CPUs 502 while locating the machine-learning model 510a with the GPU 508.

As shown, moving the video frame extractors 504a-504n out of the video inference containers, in one or more implementations, enables the video inference system 106 to reduce the number of GPUs needed to perform video inferencing. In general, because of their hardware architecture, GPUs are specialized to perform repetitive operations quickly and efficiently. Machine-learning model inferencing often includes repetitive operations, especially when batch processing (e.g., running the same operations on multiple video frames at the same time).

Additionally, as described above, even when utilizing the first video inference architecture 300 with parallel pipelining processing (e.g., see FIG. 4B), the GPU remains underutilized. Indeed, the preprocessing operations to prepare a digital video file for inferencing commonly requires a large number of operations and, thus, takes much longer than the time needed to inference a preprocessed video file (e.g., an arrayed video file). Accordingly, to improve the utilization and efficiency of the GPU 508, the video inference system 106 implements a multiple-to-one ratio of preprocessing to inferencing as shown.

Accordingly, as illustrated in FIG. 5A, the second video inference architecture 500 includes multiple video frame extractors paired to the one GPU 508 and machine-learning model 510a. Indeed, by parallelizing multiple video frame extractors (and corresponding CPUs) to preprocesses digital video files in connection with serializing the machine-learning model 510a to inference the preprocessed file (in the GPU 508), the video inference system 106 is able to decrease the overall processing time of digital video files. Additionally, the video inference system 106 also improves efficiency by not leaving the GPU 508 idle running at 100% utilization. Further, because the CPUs 502 and the GPU 508 are being used efficiently, the overall processing requirements of the second video inference architecture 500 is greatly reduced compared to previous systems.

To further illustrate by way of example, suppose the video inference system 106 receives a batch of digital video files that are each 300 megabytes. In this example, a video frame extractor takes 60 seconds to preprocess one of the received digital video files while the GPU 508 takes 4.5 seconds to perform inferencing on a preprocessed digital video file (e.g., the machine-learning model 510a inferences just over 13 arrayed video files per minute). Accordingly, to achieve 100% usage at the GPU 508, the video inference system 106 needs to utilize 14 video frame extractors in parallel to keep the GPU 508 fully stocked.

In one or more implementations, the second video inference architecture 500 includes additional components to process additional digital video files. For example, as shown the second video inference architecture 500 optionally includes additional GPUs 514 each having an additional machine-learning model 510g. In these implementations, with each additional GPU added to the second video inference architecture 500, the second video inference architecture 500 adds several additional CPUs such that the multi-CPU-to-GPU ratio is maintained.

To illustrate, in the context of the above example, suppose the video inference system 106 has a target processing goal of 200 processed digital video files every minute. Here, the video inference system 106 increases both the number of CPUs and GPUs while maintaining the same multi-CPU-to-GPU ratio that achieves 100% utilization of each GPU. For example, the video inference system 106 needs 200 CPUs, each having a video frame extractor (e.g., n=200), to generate 200 arrayed video files per minute. Additionally, the video inference system 106 needs 16 GPUs to inference the 200 arrayed video files per minute (e.g., 200 arrayed video files per minute/13 arrayed video files inferenced per minute at one GPU=15.4 GPUs) Indeed, for the video inference system 106 to process 200 digital video files per minute, the second video inference architecture 500 needs at least 200 CPUs and 16 GPUs.

As demonstrated above, the video inference system 106 is able to flexibly scale the second video inference architecture 500 without jeopardizing efficiency. Further, because the second video inference architecture 500 does not utilize a fan-out mechanism, complexity is significantly reduced compared to the conventional systems discussed above. Indeed, as described above, the GPU 508 quickly inferences multiple arrayed video files in a short time period without being dependent on co-processing by other GPUs.

Moreover, because the video inference system 106 fully utilizes (or nearly fully utilizes) the CPUs 502 and the GPU 508, the number of components is reduced compared to conventional systems. Indeed, fewer components are needed to process the same number of digital video files in a given amount of time. Accordingly, both computing costs and processing costs are significantly reduced, as further discussed below.

As mentioned above, FIG. 5B provides additional detail regarding the video frame extractors 504a-504n. As illustrated, FIG. 5B includes a video file 518 (i.e., a digital video file), a video frame extractor 504, and an arrayed video file 506. Additionally, as shown, the video frame extractor 504 includes a frame extractor 520, video frames 522, a frame resizer 524, reduced-sized video frames 526, a frame decoder 528, and an arrayed file generator 530. While not shown in FIG. 5B for simplicity, in many implementations, the video frame extractor 504 is implemented by a CPU of the CPUs 502 as described above.

In one or more implementations, the video inference system 106 utilizes the video frame extractor 504 to preprocess the video file 518 to generate the arrayed video file 506. In particular, in various implementations, the video frame extractor 504 includes the frame extractor 520, which extracts the video frames 522 from the video file 518 needed by the machine-learning model 510a. In some implementations, the frame extractor 520 extracts every video frame from the video file. In alternative implementations, the frame extractor 520 extracts a sample of video frames from the video file 518.

In addition, as shown, the video frame extractor 504 includes the frame resizer 524. In various implementations, the frame resizer 524 downsamples or shrinks the size of the video frames 522 to generate the reduced-sized video frames 526. For example, the frame resizer 524 reduces the video frames 522 from 1920×1080, 1024×768, or another resolution down to 320×224a. In various implementations, the frame resizer 524 reduces the video frames 522 down to a resolution at which the machine-learning model 510a was trained (e.g., the machine-learning model 510a is fitted or optimized to process images at 320×224). In one or more implementations, the video frame extractor 504 omits the frame resizer 524.

As shown, the video frame extractor 504 includes the frame decoder 528. In one or more implementations, the frame decoder 528 decodes the reduced-sized video frames 526, as described above. Further, the video frame extractor 504 includes the arrayed file generator 530. In some implementations, the arrayed file generator 530 combines the decoded video frames into the arrayed video file 506 (e.g., a single arrayed video file per digital video file). Additionally, in a number of implementations, the arrayed file generator 530 writes or saves the arrayed video file 506 to memory or disk for the GPU to easily access, as described previously.

As mentioned above, in various implementations, the arrayed file generator 530 generates a NumPy file as the arrayed video file. In various implementations, the arrayed video file is another type of data structure file. Further, in some implementations, the arrayed file generator 530 writes each pixel of each of the decoded video frames as an unsigned byte (e.g., utilizing uint8 format). In this manner, the video frame extractor 504 generates arrayed video files that are much smaller than traditional decoded files.

As just mentioned, in a number of implementations, the video inference system 106 generates an arrayed video file that is equivalent (or approximately equivalent) in size to an input digital video file. To further illustrate, suppose the video inference system 106 receives a 300-megabyte digital video file for processing, which consists of around 9,000 frames. In one or more implementations, the video inference system 106 extracts and samples 1 video frame in 5 frames. Additionally, the video inference system 106 resizes the video frames to 320×224 before decoding the sampled video frames. Further, the video inference system 106 saves the decoded video frames in uint8 format in a single NumPy file. In this example, the size of the arrayed video file is around 300 megabytes. In contrast, many conventional systems would generate a decoded file of over 1,200 megabytes. Thus, in some implementations, the video inference system 106 maintains the size of an input digital video file after decoding the video to an arrayed video file.

Moving to the next figure, FIG. 6 illustrates a timing diagram for processing digital video files utilizing the second video inference architecture 500 in accordance with one or more implementations. As shown, FIG. 6 includes multiple CPUs 602a-602c (e.g., CPU1 602a, CPU2 602b, and CPU3 602c) and a GPU 508. In various implementations, each of the CPUs 602a-602c includes a video frame extractor that preprocesses a digital video file (e.g., generate arrayed video files), as described above. Further, the GPU 508 includes one or more machine-learning models that inference the digital video files, which as previously described.

As shown, the CPUs 602a-602c preprocess three digital video files in parallel during the first period of time (e.g., "Prepare 1"-"Prepare 3"). As described above, in one or more implementations, preprocessing includes video frame extraction, resizing, frame decoding, and/or combining to create a single arrayed video file per digital video file. Similarly, the CPUs 602a-602c preprocesses three digital video files in parallel during the second period of time (e.g., "Prepare 5"-"Prepare 7"). The CPUs 602a-602c further preprocesses additional digital video files in the third and subsequent time periods.

In addition, FIG. 6 shows the GPU 404 inferencing digital video files during the first period (e.g., "Infer x"-"Infer z"). For example, the GPU 508 inferences Video Files X-Z in the first time period, which were previously preprocessed. In the second period of time, the GPU 404 inferences the first digital video file (e.g., "Infer 1"), the second digital video file (e.g., "Infer 2"), and the third digital video file (e.g., "Infer 3"). Similarly, the GPU 404 inferences the fourth digital video file (e.g., "Infer 4"), the fifth digital video file (e.g., "Infer 5"), and the sixth digital video file (e.g., "Infer 6") in the third time period.

As shown in FIG. 6, by utilizing multiple CPUs 602a-602c in parallel in each time period to preprocess digital video files, the video inference system 106 keeps the GPU 508 fully utilized (e.g., 100% in use) in the next time period. Further, as shown, the GPU 508 serially inferences multiple digital video files in sequence during each time period. By focusing on one digital video file at a time, the GPU 508 is able to reduce computing processing complexity over conventional systems and generate inferred results more quickly with fewer errors (e.g., more accurately).

As mentioned above, the video inference system 106 utilizes physical CPU cores and/or virtual CPUs (i.e., vCPUs). For instance, in one or more implementations, the video inference system 106 utilizes multithreading/multiprocessing along with vCPUs to preprocess digital video files. In some implementations, to fully utilize the vCPUs, the video inference system 106 determines the number of vCPUs in a CPU container (or core). For example, if the video inference system 106 utilizes a computing process that creates x vCPUs per thread (or process in the case of multiprocessing), the video inference system 106 utilizes the following formula to determine the number of threads (or processes) needed to extract video frames from digital video files.

$$\text{Number of Threads} = \text{No of } vCPU \text{ in a } CPU/x$$

For example, if the computing process creates 4 vCPUs per thread, the video inference system 106 determines that for a given number of threads T, the number of vCPUs that are created is 4T. By determining the number of vCPUs, in one or more implementations, the video inference system 106 ensures that preprocessing makes full use of all vCPUs. Further, in various implementations, the video inference system 106 ensures that CPU utilization is at or near full capacity, as described above, to maximize processing efficiency while performing video frame extractions and/or generating arrayed video files.

As mentioned above, by separating frame extraction and preprocessing tasks to the CPU and inferencing to the GPU, in many implementations, the video inference system 106 improves overall computing efficiency and time. Indeed, as described above, the processing efficiency and time of the second video inference architecture is superior to that of conventional systems. As evidence, FIG. 7 illustrates a chart comparing inference latency between processing digital video files on a CPU and GPU in accordance with one or more implementations.

Figure 7:
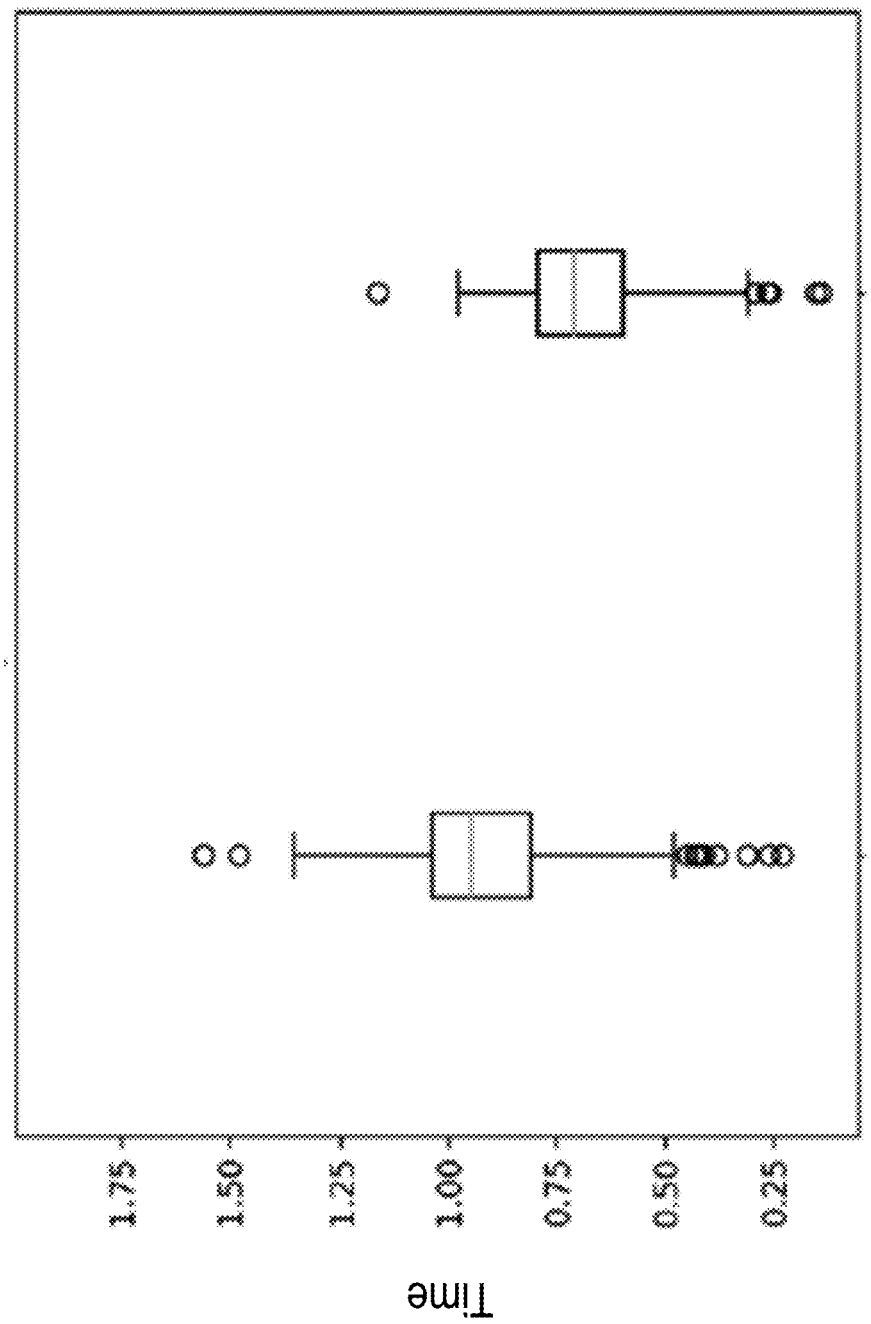
FIG. 7 illustrates a chart that compares inference latency between processing digital video files on a CPU and GPU in accordance with one or more implementations.

As shown, FIG. 7 includes a boxplot graph of CPU latency 702 and GPU latency 704 for inferencing digital video files. In the graph, the circles represent outlier data points, the box represents the interquartile range of distributions between the first quartile (e.g., 25%) and the third quartile (e.g., 75%). Additionally, the gray line with each box represents the median distribution.

As described above, many conventional systems perform inference on the CPU, as opposed to embodiments of the first video inference architecture and the second video inference architecture, which performs inferencing on a GPU. As shown in FIG. 7, the CPU latency 702 for inferencing digital video files takes is greater (e.g., takes longer) than the GPU latency 704. Indeed, FIG. 7 shows that CPU inferencing is approximately 30% faster than CPU inferencing.

When the increased efficiency (e.g., 100% GPU utilization) is coupled with the speed gains shown in FIG. 7, the costs of inferencing lower by a factor of 10 (i.e., $\frac{1}{10}$) compared to conventional systems. Indeed, the combination of fewer components (e.g., fewer GPUs) and greater utilization results in the video inference system 106 providing both computing and time savings.

Figure 8:
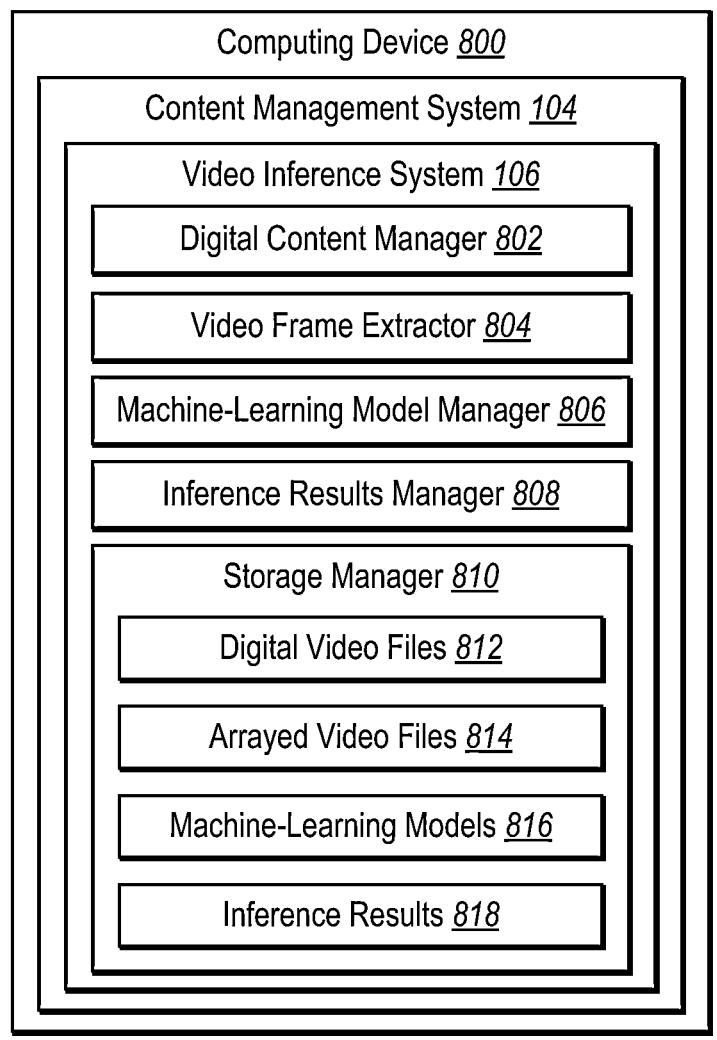
FIG. 8 illustrates a schematic diagram of an example architecture of the video inference system in accordance with one or more implementations.

Referring now to FIG. 8, additional detail is provided regarding the capabilities and components of a video inference system 106 (i.e., a digital video machine-learning inference system) in accordance with one or more implementations. In particular, FIG. 8 shows a schematic diagram of an example architecture of the video inference system 106 implemented within a content management system 104 and hosted on a computing device 800.

In addition, the computing device 800 may represent various types of computing devices (e.g., the server device 102 and/or the client devices 108a-108n). For example, in one or more implementations, the computing device 800 is a non-mobile computing device, such as a server, a cluster of servers, a desktop, or another type of non-mobile computing device. In some implementations, the computing device 800 is a mobile computing device, such as a laptop, a tablet, a mobile telephone, a smartphone, a wearable device, or a device connected to the internet. Additional details with regard to the computing device 800 are discussed below with respect to FIG. 8.

As shown, the computing device 800 includes the content management system 104, which is described above, and the video inference system 106. The video inference system 106 includes various components for performing the processes and features described herein. To illustrate, the video inference system 106 includes a digital content manager 802, a video frame extractor 804, a machine-learning model manager 806, an inference results manager 808, and a storage manager 810. As shown, the storage manager 810 includes digital video files 812, arrayed video files 814, one or more machine-learning models 816, and inference results 818.

As mentioned above, the video inference system 106 includes the digital content manager 802. In various embodiments, the digital content manager 802 facilitates the retrieval, identification, access, modification, removal, deletion, transmission, and/or storage of digital content, such as digital images and the digital video files 812. In some implementations, the digital content manager 802 stores and retrieves the digital video file 812 (e.g., pre- and post-inferencing) in connection with the storage manager 810. For example, the digital content manager 802 accesses and provides the digital video files 812 to components of the video inference system 106 (e.g., the video frame extractor 804). In some implementations, the digital content manager 802 enables a user to provide an input digital video file to the video inference system 106 for inferencing, as described above.

As shown, the video inference system 106 includes the video frame extractor 804. In one or more implementations, the video frame extractor 804 preprocesses the digital video files 812 in preparation for inferencing. For example, in various implementations, the video frame extractor 804 generates the arrayed video files 814 from the digital video files 812. In some implementations, the video frame extractor 804 extracts video frames, resizes the extracted video frames, decodes the extracted video frames, and/or combines the decoded video frames into an arrayed video file. As described previously, in many implementations, the video frame extractor 804 is implemented on a CPU and multiple video frame extractors operate in parallel on multiple CPUs (e.g., CPU containers). Additional details regarding the video frame extractors are provided above.

As shown, the video inference system 106 includes the machine-learning model manager 806. In various implementations, the machine-learning model manager 806 facilitates generating, inferencing, applying, identifying, accessing, removing, deleting, transmitting, and/or storing one or more machine-learning models 816. For example, in one or more implementations, the machine-learning model manager 806 utilizes one or more machine-learning models 816 to perform inferencing on the digital video files 812 decoded into the arrayed video files 814 to generate the inference results 818. For instance, the inference results 818 may include data analyzed from the digital video files 812 such as classification information, object segmentation masks, and/or modified versions of digital video files.

As described above, in many implementations, such as those including the second video inference architecture, the machine-learning model manager 806 serially inferences the arrayed video files 814 on a GPU. For example, utilizing a machine-learning model 816 located within a GPU, the machine-learning model manager 806 loads the arrayed video files 814 from memory, inferences the arrayed video files 814 to generate the inference results 818, and stores the inference results 818 back to memory. Additional details regarding inferencing digital video files are provided above.

As shown, the video inference system 106 includes the storage manager 810. As mentioned, the storage manager 810 includes the digital video files 812, the arrayed video files 814, the one or more machine-learning models 816, and the inference results 818. Each of these elements is further described above. For example, the video inference system 106 represents one digital video file per arrayed video file, while maintaining the same file size between a digital video file and a decoded arrayed video file, ad explained previously.

Each of the components 802-818 of the video inference system 106 may include software, hardware, or both. For example, the components 802-818 may include one or more instructions stored on a computer-readable storage medium and executable by processors of one or more computing devices, such as a client device (e.g., a mobile client device) or server device. When executed by the processors, the computer-executable instructions of the video inference system 106 may cause a computing device to perform the feature learning methods described herein. Alternatively, the components 802-818 may include hardware, such as a special-purpose processing device to perform a certain function or group of functions. In addition, the components 802-818 of the video inference system 106 may include a combination of computer-executable instructions and hardware.

Furthermore, the components 802-818 of the video inference system 106 may be implemented as one or more operating systems, as one or more stand-alone applications, as one or more modules of an application, as one or more plug-ins, as one or more library functions or functions that may be called by other applications, and/or as a cloud-computing model. Thus, the components 802-818 may be implemented as a stand-alone application, such as a desktop or mobile application. Additionally, the components 802-818 may be implemented as one or more web-based applications hosted on a remote server. The components 802-818 may also be implemented in a suite of mobile device applications or "apps." To illustrate, the components 802-818 may be implemented in an application, including but not limited to ADOBE® SENSEI™, ADOBE® PREMIERE® PRO, ADOBE® PREMIERE® RUSH®, ADOBE® PREMIERE® ELEMENTS, CREATIVE CLOUD®, ADOBE® EXPERIENCE MANAGER, PRELUDE®, or other digital content applications software packages. The foregoing are either registered trademarks or trademarks of Adobe Inc. in the United States and/or other countries.

FIGS. 1-8, the corresponding text, and the examples provide several different methods, systems, devices, and non-transitory computer-readable media of the video inference system 106. In addition to the foregoing, one or more implementations may also be described in terms of flowcharts comprising acts for accomplishing a particular result, such as the flowcharts of acts shown in FIG. 9 and FIG. 10. Additionally, the acts described herein may be repeated or performed in parallel with one another or parallel with different instances of the same or similar acts.

Figure 9:
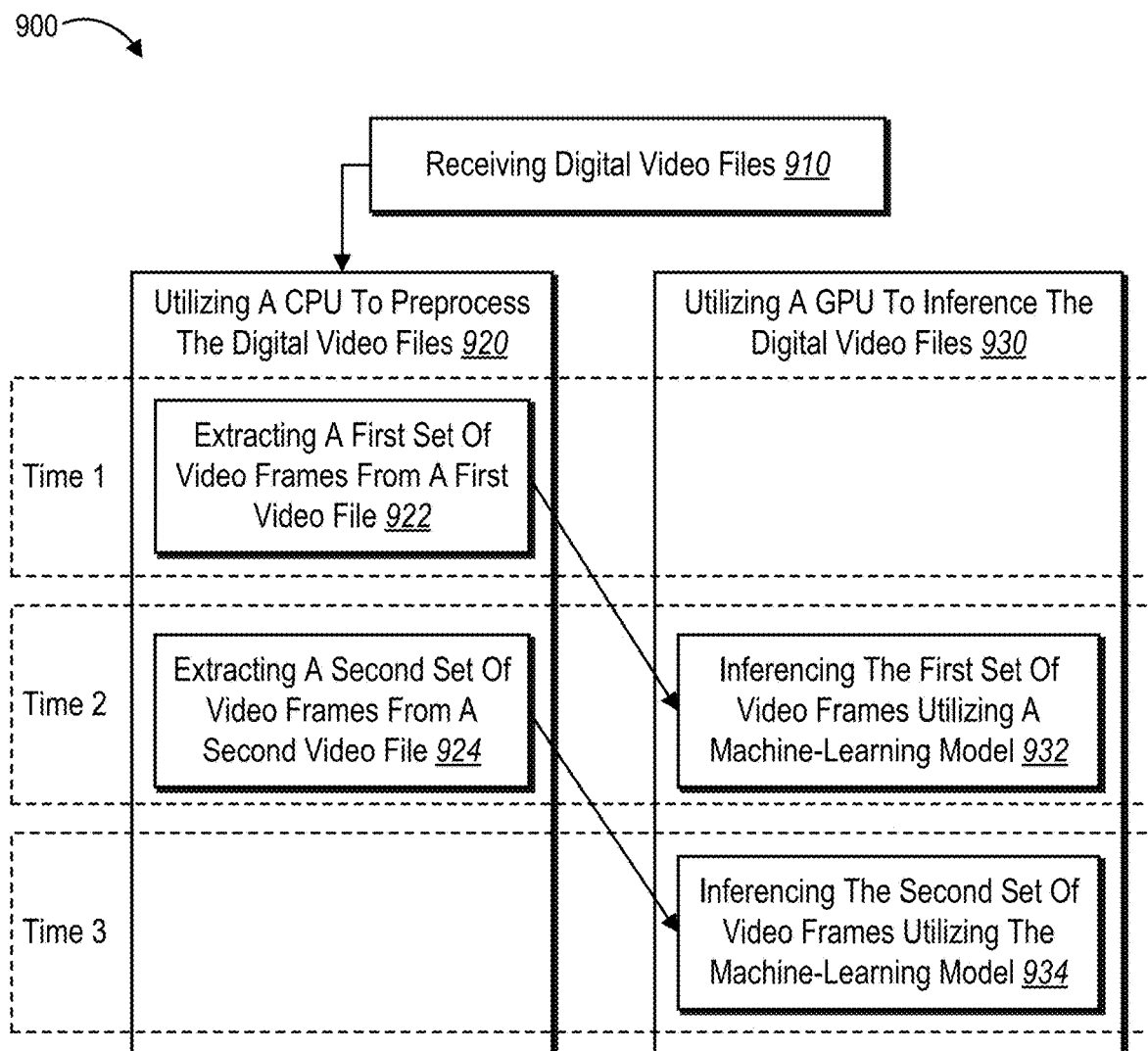
FIG. 9 illustrates a flowchart of a series of acts of utilizing the first video inference architecture for processing multiple digital videos in accordance with one or more implementations.
Figure 10:
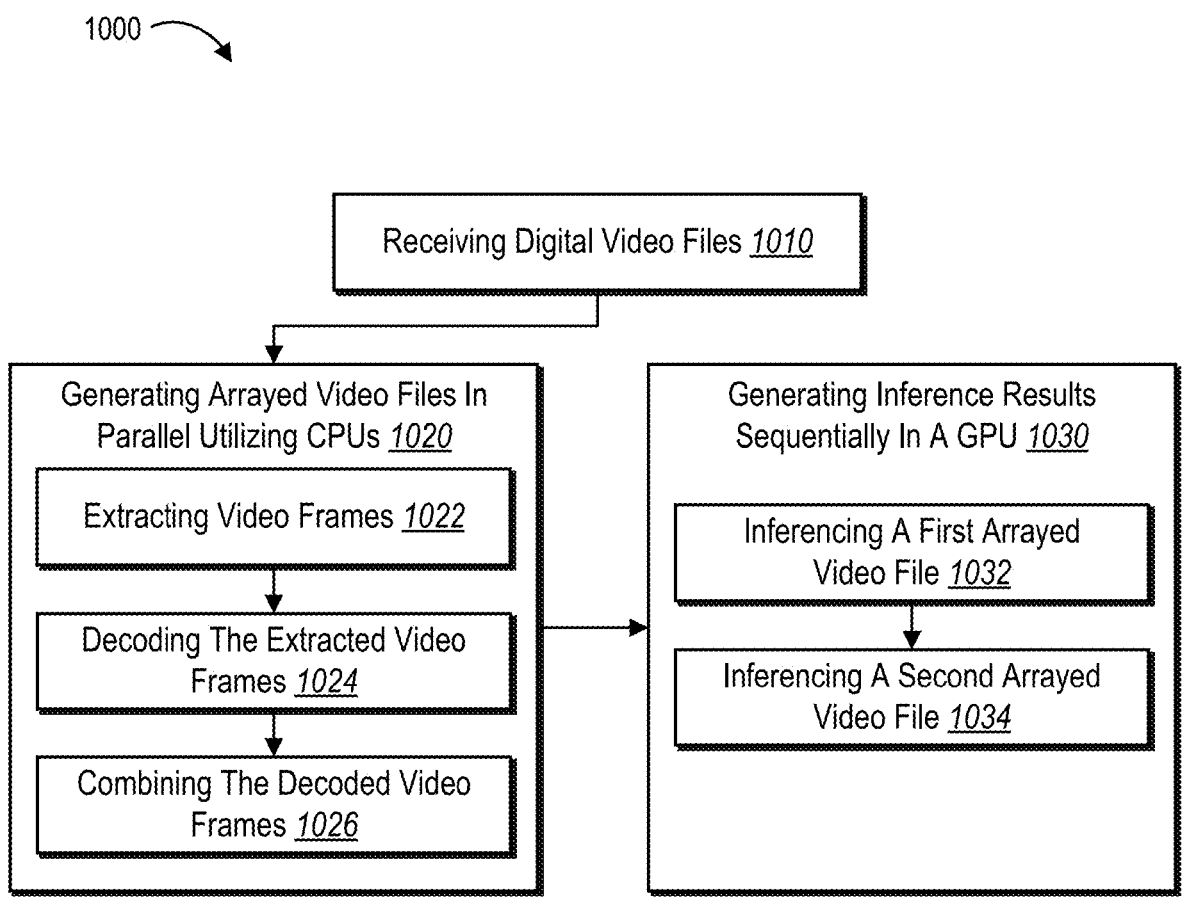
FIG. 10 illustrates a flowchart of a series of acts of utilizing the second video inference architecture for processing multiple digital videos in accordance with one or more implementations.

As mentioned previously, FIG. 9 illustrates a flowchart of a series of acts of utilizing the first video inference architecture for processing multiple digital videos in accordance with one or more implementations and FIG. 10 illustrates a flowchart of a series of acts of utilizing the second video inference architecture for processing multiple digital videos in accordance with one or more implementations. While FIG. 9 and/or FIG. 10 illustrate acts according to one implementation, alternative implementations may omit, add to, reorder, and/or modify any of the acts shown. Additionally, the acts of FIG. 9 and/or FIG. 10 may be performed as part of a method. Alternatively, a non-transitory computer-readable medium may comprise instructions that, when executed by one or more processors, cause a computing device to perform the acts of FIG. 9 and/or FIG. 10. In some implementations, a system may perform the acts of FIG. 9 and/or FIG. 10.

In one or more implementations, the series of acts of FIG. 9 is implemented on one or more computing devices, such as the server device 102, the client devices 108*a*-108*n*, or the computing device 800. In addition, in some implementations, the series of acts of FIG. 9 is implemented in a digital medium environment for utilizing machine-learning models to process digital video files. In various implementations, the series of acts of FIG. 9 is implemented on a system having a memory device that includes a plurality of digital video files including a first digital video file and a second digital video file as well as a machine-learning model for inferencing the digital video files.

To illustrate, as shown in FIG. 9, the series of acts 900 includes an act 910 of receiving digital video files. In particular, the act 910 may involve receiving a plurality of digital video files. In some implementations, the act 910 includes receiving the plurality of digital video files from a plurality of computing devices, such as multiple client devices or a server device.

As shown, the series of acts 900 also includes an act 920 of utilizing a CPU to preprocess the digital video files. For example, the act 920 includes utilizing a video inference container that includes a CPU and a GPU within a first video inference architecture, as described above. Further, as illustrated, the act 920 includes multiple sub-acts occurring at different time periods (e.g., time 1 and time 2).

As shown, the act 920 includes a sub-act 922 of extracting a first set of video frames from a first video file in a first time period. In particular, the sub-act 922 may involve extracting a first plurality of video frames from a first digital video file in a first time period utilizing the CPU. As also shown, the act 920 includes a sub-act 924 of extracting a second set of video frames from a second video file in a second time period. In particular, the sub-act 924 may involve extracting a second plurality of video frames from a second digital video file in a second time period utilizing the CPU.

In addition, as shown, the series of acts 900 also includes an act 930 of utilizing a GPU to inference the digital video files. For example, the act 930 includes utilizing the video inference container that includes the CPU and the GPU within the first video inference architecture, as described above. Further, as illustrated, the act 930 includes multiple sub-acts occurring at different time periods (e.g., time 2 and time 3).

As shown, the act 930 includes a sub-act 932 of inferencing the first set of video frames utilizing a machine-learning model in the second time period. In particular, the sub-act 932 may involve generating a first inference result by utilizing a machine-learning model to batch inference the first extracted plurality of video frames from the first digital video file in the second time period utilizing the GPU. In one or more implementations, the sub-act 932 includes extracting the second plurality of video frames from the second digital video file at the CPU in parallel with generating the first inference result at the GPU. As also shown, the act 930 includes a sub-act 934 of inferencing the second set of video frames utilizing the machine-learning model in the third time period. In particular, the sub-act 934 may involve generating a second inference result by utilizing the machine-learning model to batch inference the second extracted plurality of video frames from the second digital video file in a third time period utilizing the GPU.

The series of acts 900 may include various additional acts. For example, in one or more implementations, the series of acts 900 includes the acts of inferencing multiple digital videos concurrently and separately utilizing multiple video inference containers, where each of the video inference containers includes a CPU and a GPU. In various implementations, the series of acts 900 includes the act of merging the first inference result and the second inference result to generate a combined inference result.

As mentioned above, FIG. 10 illustrates a flowchart of a series of acts of utilizing the second video inference architecture for processing multiple digital videos in accordance with one or more implementations. In one or more implementations, the series of acts of FIG. 10 is implemented on one or more computing devices, such as the server device 102, the client devices 108a-108n, or the computing device 800. In addition, in some implementations, the series of acts of FIG. 10 is implemented in a digital medium environment for utilizing machine-learning models to process digital video files. In various implementations, the series of acts of FIG. 10 is implemented on a system having a memory device that includes a plurality of digital video files including a first digital video file and a second digital video file as well as a machine-learning model for inferencing the digital video files.

To illustrate, as shown in FIG. 10, the series of acts 1000 includes an act 1010 of receiving digital video files. In particular, the act 1010 may involve receiving a plurality of digital video files. In some implementations, the act 1010 includes receiving the plurality of digital video files from a plurality of computing devices, such as multiple client devices or a server device.

As shown, the series of acts 1000 also includes an act 1020 of generating arrayed video files in parallel utilizing CPUs. In particular, the act 1020 may include generating an arrayed video file, in parallel and for each digital video file of the plurality of digital video files utilizing a plurality of CPUs (central processing units). Further, as illustrated, the act 1020 includes multiple sub-acts occurring within the CPUs.

As shown, the act 1020 includes a sub-act 1022 of extracting video frames. In particular, the sub-act 1022 may involve extracting a plurality of video frames for each digital video file. In addition, the act 1020 includes a sub-act 1024 of decoding the extracted video frames. Further, the act 1020 includes a sub-act 1026 of combining the decoded video frames. In particular, the sub-act 1026 may involve combining the decoded plurality of video frames into the arrayed video file.

In various implementations, the act 1020 includes generating a first arrayed video file utilizing a first CPU of the plurality of CPUs and generating a second arrayed video file utilizing a second CPU of the plurality of CPUs, where the first arrayed video file and the second arrayed video file are generated in parallel. In one or more implementations, the act 1020 includes generating the first arrayed video file utilizing a virtual CPU of the plurality of CPUs. In example implementations, the act 1020 includes generating one arrayed video file per digital video file of the plurality of digital video files.

In various implementations, the act 1020 includes generating a first arrayed video file including decoded frames from a first digital video file and generating a second arrayed video file including decoded frames of a second digital video file. In one or more implementations, the act 1020 includes saving the first arrayed video file including preprocessed video data to the memory device.

In one or more implementations, the act 1020 includes generating, for a first digital video file from the plurality of digital video files, a first arrayed video file that is the same size as an input size of the first digital video file. In additional implementations, the act 1020 includes generating the first arrayed video file by resizing the extracted plurality of video frames to match a reduced-sized image resolution fitted to the machine-learning model. For example, in example implementations, the act 1020 includes downsizing the extracted plurality of video frames to a smaller resolution before decoding the extracted plurality of frames. In some implementations, the act 1020 includes generating the first arrayed video file further by utilizing an unsigned byte to represent each pixel within a decoded video frame.

In some implementations, the act 1030 includes generating inference results sequentially in a GPU. In particular, the act 1030 may involve generating, by a GPU (graphics processing unit), a plurality of inference results. Further, as illustrated, the act 1030 includes multiple sub-acts occurring within the single GPU.

As shown, the act 1030 includes a sub-act 1032 of inferencing a first arrayed video file. In particular, the sub-act 1032 may involve utilizing the machine-learning model to process or inference a first arrayed video file. As also shown, the act 1030 includes a sub-act 1034 of inferencing a second arrayed video file. In particular, the sub-act 1034 may include utilizing the machine-learning model to sequentially process a second arrayed video file.

In one or more implementations, the act 1030 includes sequentially or serially processing the arrayed video files utilizing the GPU by completing inferencing (i.e., processing) of the first arrayed video file of the arrayed video files before beginning to inference (i.e., process) the second arrayed video file of the arrayed video files. In some implementations, the act 1030 includes sequentially generating an inference result for each of the arrayed video files at the GPU utilizing batch inferencing without pausing between processing the arrayed video files. In example implementations, the act 1030 includes utilizing the GPU to load the first arrayed video file from the memory device and generate the one or more first inference results by utilizing the machine-learning model to inference the preprocessed video data within the first arrayed video file.

In some implementations, the act 1030 includes generating the one or more second inference results at the GPU by processing the second arrayed video file upon fully processing the first arrayed video file. In a number of implementations, the act 1030 includes utilizing a convolutional neural network as the machine-learning model to generate the plurality of inference results, which includes image classifications, image segmentations, video frame modifications, or detected objects.

The series of acts 1000 may include various additional acts. For example, in one or more implementations, the series of acts 1000 includes the acts of generating, in parallel and for each digital video file of an additional plurality of digital video files, an additional plurality of arrayed inference results utilizing an additional plurality of CPUs; and generating, by an additional GPU, an additional plurality of inference results utilizing an additional instance of the machine-learning model to sequentially process each of the additional arrayed video files. In some implementations, the series of acts 1000 includes concurrently generating the plurality of inference results at the GPU and the additional plurality of inference results at the additional GPU.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the video inference system to preprocess and inference digital video files and digital images, as described herein.

Implementations of the present disclosure may comprise or utilize a special-purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

The computer-readable media may be any available media that is accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure may comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media may include a network and/or data links that are used to carry desired program code means in the form of computer-executable instructions or data structures and that are accessed by a general-purpose or special-purpose computer. Combinations of the above should also be included within the scope of computer-readable media.

Further, upon reaching various computer system components, program code means in the form of computer-executable instructions or data structures may be transferred automatically from transmission media to non-transitory computer-readable storage media (devices) (or vice versa). For example, computer-executable instructions or data structures received over a network or data link may be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) may be included in computer system components that also (or even primarily) utilize transmission media.

Computer-executable instructions comprise, for example, instructions and data which, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure may also be implemented in cloud computing environments. As used herein, the term "cloud computing" refers to a model for enabling on-demand network access to a shared pool of configurable computing resources. For example, cloud computing is employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud-computing model may be composed of various characteristics such as, for example, on-demand self-service, broad network access, resource pooling, rapid elasticity, measured service, and so forth. A cloud-computing model may also expose various service models, such as, for example, Software as a Service ("SaaS"), Platform as a Service ("PaaS"), and Infrastructure as a Service ("IaaS"). A cloud-computing model may also be deployed using different deployment models such as private cloud, community cloud, public cloud, hybrid cloud, and so forth. In addition, as used herein, the term "cloud-computing environment" refers to an environment in which cloud computing is employed.

Figure 11:
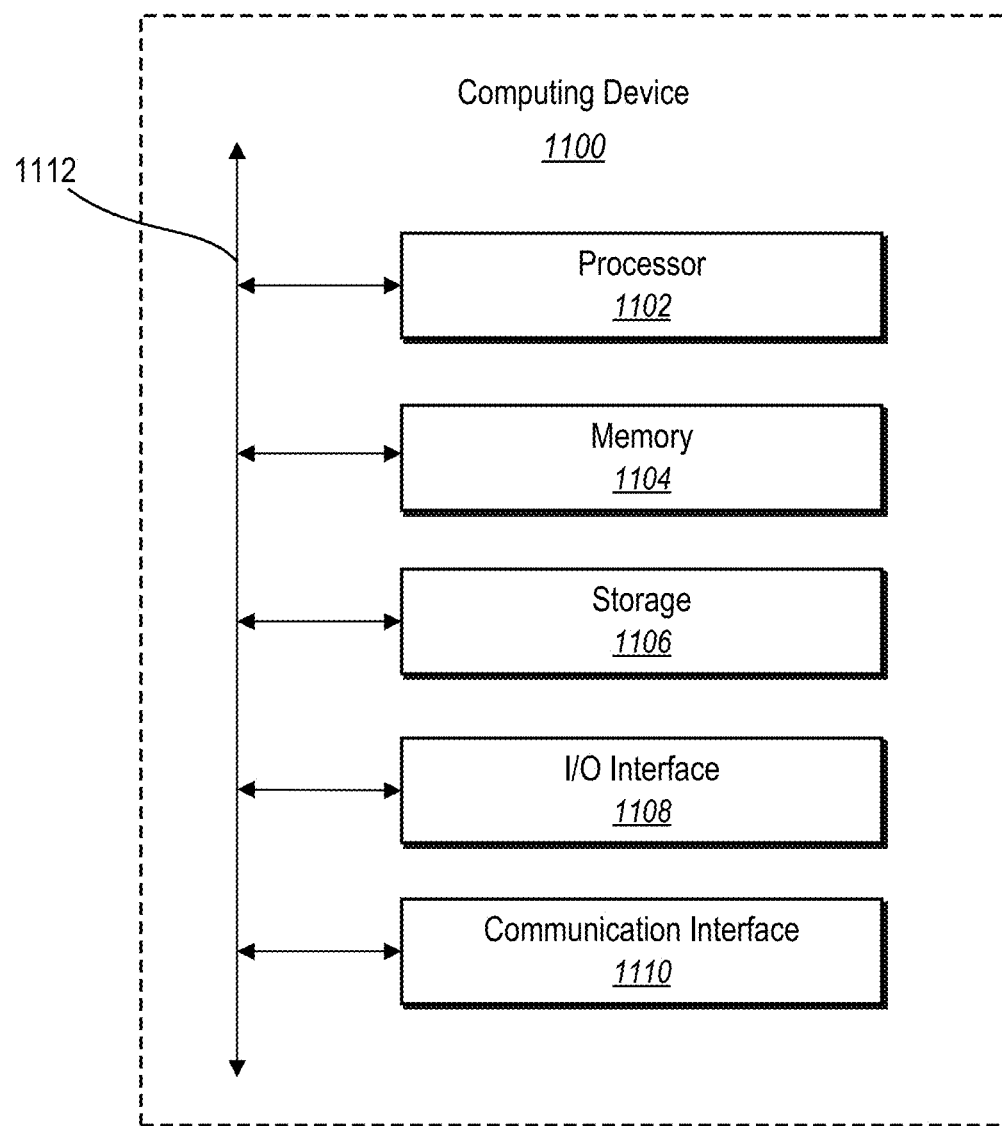
FIG. 11 illustrates a block diagram of an example computing device for implementing one or more implementations of the present disclosure.

FIG. 11 illustrates a block diagram of an example computing device 1100 that may be configured to perform one or more of the processes described above. One will appreciate that one or more computing devices, such as the server device 102, the client devices 108a-108n, or the computing device 800. In one or more implementations, the computing device 1100 may be a non-mobile device (e.g., a desktop computer, a server device, a web server, a file server, a social networking system, a program server, an application store, or a content provider). Further, the computing device 1100 may be a server device that includes cloud-based processing and storage capabilities. In some implementations, the computing device 1100 may be a mobile device (e.g., a laptop, a tablet, a smartphone, a mobile telephone, a camera, a tracker, a watch, a wearable device, etc.).

As shown in FIG. 11, the computing device 1100 includes one or more processor(s) 1102, memory 1104, a storage device 1106, input/output ("I/O") interfaces 1108, and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other implementations. Furthermore, in certain implementations, the computing device 1100 includes fewer components than those shown in FIG. 11. Components of the computing device 1100 shown in FIG. 11 will now be described in additional detail.

In particular implementations, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive, or a combination of these or other storage devices.

As shown, the computing device 1100 includes one or more I/O interfaces 1108, which are provided to allow a user to provide input to (e.g., user strokes), receive output from, and otherwise transfer data to and from the computing device 1100. These I/O interfaces 1108 may include a mouse, keypad or a keyboard, a touch screen, camera, optical scanner, network interface, modem, other known I/O devices, or a combination of these I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   receiving a plurality of digital video files;
   generating, in parallel and for each digital video file of the plurality of digital video files utilizing a set of processing units, arrayed video files by:
   extracting a plurality of video frames for a digital video file from the plurality of digital video files to generate an extracted plurality of video frames;
   decoding the extracted plurality of video frames to generate a decoded plurality of video frames for the digital video file; and
   combining the decoded plurality of video frames into an arrayed video file; and
   generating, by an additional set of processing units, a plurality of inference results by utilizing a machine-learning model to sequentially process each of the arrayed video files.

2. The computer-implemented method of claim 1, further comprising inferencing multiple digital videos separately and concurrently utilizing multiple video inference containers.

3. The computer-implemented method of claim 1, further comprising generating, for a first digital video file from the plurality of digital video files, a first arrayed video file that is a same size as an input size of the first digital video file.

4. The computer-implemented method of claim 3, further comprising generating the first arrayed video file for the first digital video file by resizing the extracted plurality of video frames to match a reduced-sized image resolution fitted to the machine-learning model.

5. The computer-implemented method of claim 3, further comprising generating the first arrayed video file for the first digital video file by utilizing an unsigned byte to represent each pixel within a decoded video frame.

6. The computer-implemented method of claim 1, further comprising:
   generating, in parallel and for each digital video file of an additional plurality of digital video files, an additional plurality of arrayed video files; and
   generating an additional plurality of inference results utilizing an additional instance of the machine-learning model to sequentially process each of the additional arrayed video files from the additional plurality of arrayed video files.

7. The computer-implemented method of claim 6, further comprising concurrently generating the plurality of inference results and the additional plurality of inference results.

8. The computer-implemented method of claim 1, further comprising sequentially generating an inference result for each of the arrayed video files utilizing batch inferencing.

9. The computer-implemented method of claim 1, further comprising utilizing a convolutional neural network as the machine-learning model to generate the plurality of inference results, which comprises image classifications, image segmentations, video frame modifications, or detected objects.

10. A system comprising:
    a memory device comprising a plurality of digital video files including a first digital video file and a second digital video file;
    a plurality of processing units configured to cause the system to:
    extract a plurality of video frames from the plurality of digital video files;
    decode the extracted plurality of video frames;
    generate a first arrayed video file comprising the decoded video frames of the first digital video file; and
    generate a second arrayed video file comprising the decoded video frames of the second digital video file; and
    one or more additional processing units configured to cause the system to sequentially process the first arrayed video file and the second arrayed video file to:
    generate one or more first inference results by utilizing a machine-learning model to process the first arrayed video file; and
    generate one or more second inference results by utilizing the machine-learning model to process the second arrayed video file.

11. The system of claim 10, wherein the plurality of processing units is further configured to cause the system to:
    generate the first arrayed video file utilizing a first processing unit; and
    generate the second arrayed video file utilizing a second processing unit, wherein the first arrayed video file and the second arrayed video file are generated in parallel.

12. The system of claim 10, wherein the one or more additional processing units is further configured to cause the system to generate the one or more second inference results by processing the second arrayed video file upon fully processing the first arrayed video file.

13. The system of claim 10, wherein the plurality of processing units is further configured to cause the system to downsize the extracted plurality of video frames to a smaller resolution before decoding the extracted plurality of video frames.

14. The system of claim 10, wherein:
    the plurality of processing units is further configured to save the first arrayed video file comprising preprocessed video data to the memory device; and
    the one or more additional processing units is further configured to:
    load the first arrayed video file from the memory device; and
    generate the one or more first inference results by utilizing the machine-learning model to inference the preprocessed video data within the first arrayed video file.

15. The system of claim 10, wherein the plurality of processing units is further configured to cause the system to generate the first arrayed video file utilizing a virtual processing unit.

16. The system of claim 10, wherein the plurality of processing units is further configured to cause the system to generate one arrayed video file per digital video file of the plurality of digital video files.

17. A non-transitory computer-readable medium comprising instructions that, when executed by at least one processor, cause the at least one processor to perform operations comprising:
receiving a plurality of digital video files;
generating, in parallel and for each digital video file of the plurality of digital video files utilizing a set of processing units, arrayed video files by:
extracting a plurality of video frames for a digital video file from the plurality of digital video files to generate an extracted plurality of video frames;
decoding the extracted plurality of video frames to generate a decoded plurality of video frames for the digital video file; and
combining the decoded plurality of video frames into an arrayed video file; and
generating, by an additional set of processing units, a plurality of inference results by utilizing a machine-learning model to sequentially process each of the arrayed video files.

18. The non-transitory computer-readable medium of claim 17, further comprising sequentially processing the arrayed video files utilizing the by completing inferencing of a first arrayed video file of the arrayed video files before beginning to inference a second arrayed video file of the arrayed video files.

19. The non-transitory computer-readable medium of claim 17, further comprising sequentially generating an inference result for each of the arrayed video files utilizing batch inferencing.

20. The non-transitory computer-readable medium of claim 17, further comprising utilizing a convolutional neural network as the machine-learning model to generate the plurality of inference results, which comprises image classifications, image segmentations, video frame modifications, or detected objects.

* * * * *